US009036950B2

(12) United States Patent
Chan et al.

(10) Patent No.: US 9,036,950 B2
(45) Date of Patent: May 19, 2015

(54) AUTOGENERATING VIDEO FROM TEXT

(71) Applicant: Elwha LLC, Bellevue, WA (US)

(72) Inventors: Alistair K. Chan, Bainbridge Island, WA (US); William Gates, Redmond, WA (US); Paul Holman, Seattle, WA (US); Roderick A. Hyde, Redmond, WA (US); Edward K. Y. Jung, Las Vegas, NV (US); Jordin T. Kare, Seattle, WA (US); Nathan P. Myhrvold, Bellevue, WA (US); Keith David Rosema, Seattle, WA (US); Clarence T. Tegreene, Bellevue, WA (US); Lowell L. Wood, Jr., Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 0 days.

(21) Appl. No.: 14/262,264

(22) Filed: Apr. 25, 2014

(65) Prior Publication Data

US 2014/0233864 A1   Aug. 21, 2014

Related U.S. Application Data

(62) Division of application No. 13/355,194, filed on Jan. 20, 2012, now Pat. No. 8,731,339.

(51) Int. Cl.
*G06K 9/20* (2006.01)
*G06K 9/32* (2006.01)
*G06T 13/00* (2011.01)

(52) U.S. Cl.
CPC .............. *G06K 9/20* (2013.01); *G06K 9/3258* (2013.01); *G06T 13/00* (2013.01)

(58) Field of Classification Search
CPC .......... H04N 1/00864; H04N 1/00872; H04N 1/32144; H04N 1/32208; H04N 1/32251; H04N 1/32309; H04N 5/262; H04N 21/42204; H04N 21/4316; H04N 21/47; H04N 21/478; H04N 21/482; G06F 3/011; G06F 17/212; G06F 17/2785; G06F 17/2229; G06F 17/2211; G06F 17/2247; G06F 17/2264; G06F 17/30017; G06F 17/30025; G06F 17/30056; G06F 17/30067; G06F 17/30256; G06F 17/30265; G06F 17/30274; G06F 17/30743; G06F 17/30749; G06F 17/30781; G06F 17/30817; G06F 17/30855; G06T 13/00; G06T 13/20; G06T 13/40; G06T 2213/04; G10L 13/043; G10L 15/26; G11B 27/05; G11B 27/0311; G11B 27/28; G11B 27/322; G11B 27/34; G09B 5/062; G09B 5/14; G09B 9/00; G09B 19/24; G09B 25/02; Y10S 707/915; Y10S 707/916; Y10S 707/917; Y10S 707/927; Y10S 707/966; Y10S 707/99933; Y10S 707/99934; Y10S 707/99943; Y10S 707/99945; Y10S 707/99948

See application file for complete search history.

(56) References Cited

U.S. PATENT DOCUMENTS 5,174,759 A   12/1992  Preston et al.
5,493,677 A   2/1996   Balogh et al.
(Continued)

FOREIGN PATENT DOCUMENTS

WO   WO-2008/148211   12/2008
WO   WO-2010/045733   4/2010
(Continued)

OTHER PUBLICATIONS

Hartmann, K. et al., "A Spreading Activation Approach to Text Illustration", Int. Symp. on Smart Graphics, Jun. 11-13, 2002, Hawthorne, NY, USA.
(Continued)

*Primary Examiner* — Jose Couso
(74) *Attorney, Agent, or Firm* — Foley & Lardner LLP

(57) ABSTRACT

A method of converting user-selected printed text to a synthesized image sequence is provided. The method includes capturing a first image of printed text and generating a model information associated with the text.

35 Claims, 11 Drawing Sheets

(56) References Cited

U.S. PATENT DOCUMENTS

| | | |
|---|---|---|
| 5,524,193 A | 6/1996 | Covington et al. |
| 5,788,283 A | 8/1998 | Adler |
| 5,899,700 A | 5/1999 | Williams et al. |
| 5,954,515 A | 9/1999 | Iggulden |
| 6,041,025 A | 3/2000 | Ohga et al. |
| 6,544,040 B1 | 4/2003 | Brelis et al. |
| 6,544,294 B1 | 4/2003 | Greenfield et al. |
| 6,633,741 B1 | 10/2003 | Posa et al. |
| 6,804,684 B2 | 10/2004 | Stubler et al. |
| 6,985,913 B2 | 1/2006 | Murata |
| 7,016,828 B1 | 3/2006 | Coyne et al. |
| 7,028,253 B1 | 4/2006 | Lieberman et al. |
| 7,085,693 B2 | 8/2006 | Zimmerman |
| 7,111,774 B2 | 9/2006 | Song |
| 7,309,283 B2 | 12/2007 | Nemitz |
| 7,654,575 B1 | 2/2010 | Haag |
| 7,890,534 B2 | 2/2011 | Bathiche et al. |
| 7,904,812 B2 | 3/2011 | Atlas et al. |
| 8,325,192 B2 | 12/2012 | Cao et al. |
| 8,340,493 B2 | 12/2012 | Axen et al. |
| 2001/0049596 A1 | 12/2001 | Lavine et al. |
| 2008/0215310 A1 | 9/2008 | Audant |
| 2009/0100339 A1 | 4/2009 | Wharton-Ali et al. |
| 2009/0254826 A1 | 10/2009 | Schwab et al. |

FOREIGN PATENT DOCUMENTS

| | | |
|---|---|---|
| WO | WO-2010/045735 | 4/2010 |
| WO | WO-2010/045736 | 4/2010 |
| WO | WO-2010/045737 | 4/2010 |
| WO | WO-2010/081225 | 7/2010 |
| WO | WO-2010/118528 | 10/2010 |

OTHER PUBLICATIONS

Storytelling, www.xtranormal.com, accessed on May 8, 2012, 2 pages.

AUTOGENERATING VIDEO FROM TEXT

CROSS-REFERENCE TO RELATED PATENT APPLICATIONS

This is a divisional of U.S. application Ser. No. 13/355,194, filed Jan. 20, 2012, which is incorporated herein by reference in its entirety.

BACKGROUND

The present application relates generally to the field of generating synthesized image sequences. The present application relates more specifically to the field of generating synthesized image sequences based on a selected textual passage.

School textbooks are notorious for their dry presentation of material. Paintings or photographs are often included in the textbook to maintain the student's interest and to provide context to the subject matter being conveyed. However, due to limited space, only a limited number of images may be included in the textbook. Further, students with dyslexia, attention deficit disorder, or other learning disabilities may have difficulty reading long passages of text. Thus, there is a need for improved systems and methods of conveying the subject matter underlying the text to a reader.

SUMMARY

One embodiment relates to a method of converting user-selected printed text to a synthesized image sequence. The method includes capturing a first image of printed text and generating a model information associated with the text.

Another embodiment relates to a system for converting user-selected printed text to a synthesized image sequence. The system includes processing electronics configured to receive an image of text and, in response to receiving the image, to generate a model information associated with the text.

Another embodiment relates to a computerized method of sharing a synthesized image sequence generated from user-selected text. The method includes generating a model information associated with a textual passage and exporting a file, the file configured to enable another user to generate a synthesized image sequence.

Another embodiment relates to a system for converting a textual passage to a synthesized image sequence. The system includes processing electronics configured to determine a first textual passage being read by a user, to predict a second textual passage that will be read by the user, and to generate a synthesized image sequence associated with the textual passage.

Another embodiment relates to a method of converting a textual passage to a synthesized image sequence. The method includes determining a first textual passage currently being read by a user; predicting a second textual passage that will be read by the user; and generating a synthesized image sequence associated with the second textual passage.

Another embodiment relates to a system for converting a textual passage to a synthesized image sequence. The system includes processing electronics configured to generate a model information associated with a textual passage in response to the textual passage being written.

Another embodiment relates to a computerized method of converting a textual passage to a synthesized image sequence. The method includes generating a model information associated with a textual passage in response to the textual passage being written.

The foregoing is a summary and thus by necessity contains simplifications, generalizations and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
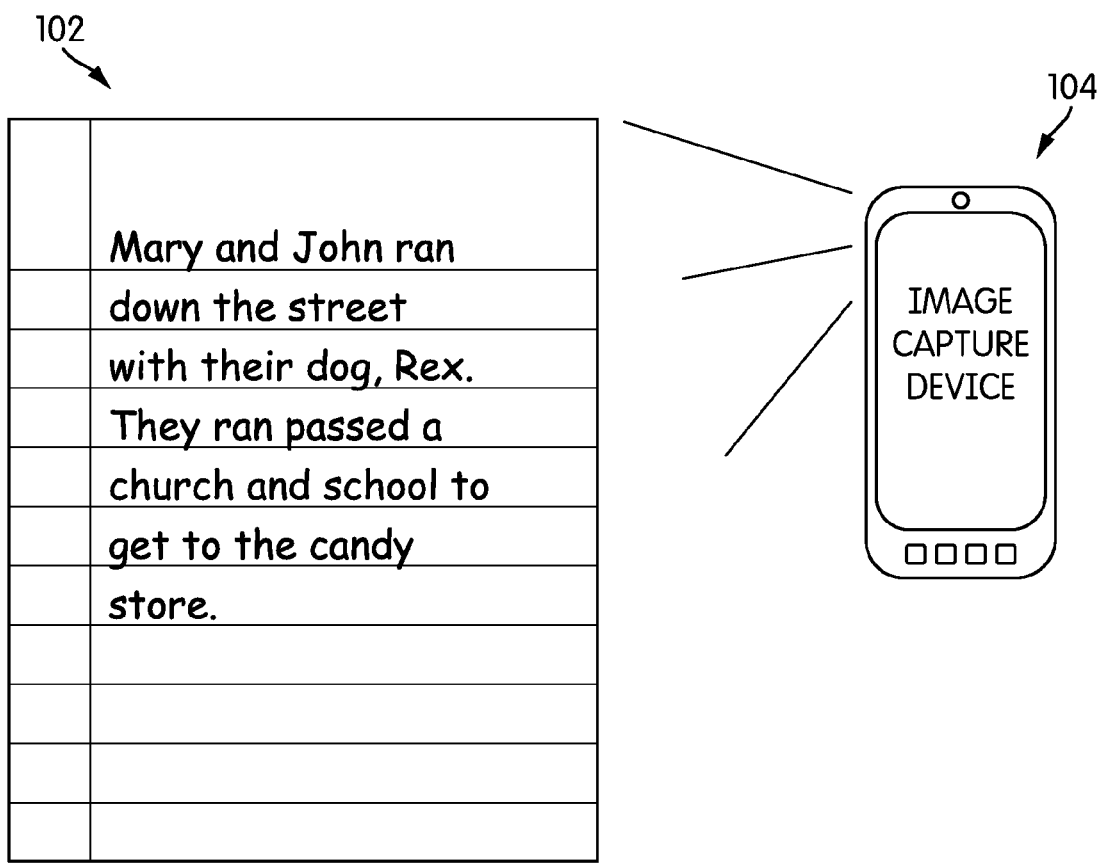
FIG. 1 is a schematic diagram of text and an image capture device, shown according to an exemplary embodiment.

Referring generally to the Figures, systems and methods for the generation of synthesized image sequences (e.g., video) based on printed text are shown and described. A person may be reading a block of text from a textual passage (e.g., from a book, magazine, journal, electronic book (e-book), computer, cell phone, a paper with handwritten text, portion of a painting, newspaper, or any other source of text). An image of the block of text is captured and the block of text may be analyzed to determine the actual text and the context of the text. A model information may then be generated that is representative of the text. The model information may be of any format (e.g., wireframe, solid, shell, boundary, two-dimensional, three-dimensional, etc.) in any language (e.g., markup language, extensible markup language (XML) virtual reality markup language (VRML), X3D, 3DXML, etc.). The model information may be output as a file or streamed, for example, to a rendering engine. A synthesized image sequence may then be generated based on the model information. The synthesized image sequence may be of any format (e.g., a series of pictures, a single video, a cartoon, a 2D video, a 3D video, etc.) and used in many types of media. While the present disclosure uses the term "video" or "video clip" to often describe the synthesized image sequence, it should be understood that any type of synthesized image sequence may be generated using the systems and methods of the present disclosure.

The synthesized image sequence may be generated using a preference file in addition to the block of text. The preference file indicates user preferences to be applied when the video clip is generated. The preference file may include types of people or characters to include in the video clip, setting information, and other information that affects the display of the synthesized image sequence. According to one embodiment, the model information may be generated based on the preference file. According to another embodiment, the synthesized image sequence may be generated based on the model information and the preference file.

The systems and methods of the present disclosure may be used to predict text that a person is about to read, and to generate a synthesized image sequence based on the predicted text. For example, a reading speed of the person may be measured or provided and synthesized image sequences for "upcoming" text may be generated in anticipation of the person reading the text. Further, the systems and methods of the present disclosure may be used in real-time (e.g., for real-time typing or handwriting, synthesized image sequences may be generated as the text is being generated by the person).

According to one contemplated scenario, a student is assigned a reading assignment. To make the assignment more interesting, the student may use his or her mobile phone to take a picture of a page of the textbook. The systems and methods described herein may then generate a synthesized image sequence of the action occurring in the text. Thus, rather than simply reading names and dates, the student may see soldiers running across a battlefield. The systems and methods may further gather auxiliary information (e.g., the color of the soldiers' uniforms, the topographical layout of the battlefield, what the generals looked like, time of year, weather conditions, etc.), which may be incorporated into the synthesized image sequences. Presenting the information in a visual, rather than textual, fashion may help to put the information in context and to create cross-references in the student's brain which may help the student to recall the information at a later date. The student may then share one or more files with classmates, enabling them to generate the finished sequences. For example, the student may share his or her finished segments, a model information, a preference file, or other files necessary to generate the image sequence.

For purposes of this disclosure, the term "coupled" means the joining of two members directly or indirectly to one another. Such joining may be stationary in nature or moveable in nature and such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Referring to FIG. 1, a block of text 102 is shown. The block of text 102 may be part of a textual passage provided from any source (e.g., a book, magazine, electronic book, etc.). An image capture device 104 may capture an image of the block of text 102. The image capture device 104 may be a camera, scanner, or other electronic device configured to capture an image including text. The camera may be a standalone camera, coupled to a mobile phone, coupled to a laptop, desktop, or other computing device, coupled to any personal electronic device, or otherwise. The systems and methods of the present disclosure are not limited based on the type of image capture device.

The block of text 102 may be any type of text from any type of source. As one example, the block of text 102 may be typeset text, for example, from a portion of a book, from a portion of a magazine, from a portion of a newspaper, etc., may be text on an electronic computer, may be handwritten text, may be text from a painting or drawing, may be text from an inscription, or otherwise. The systems and methods of the present disclosure are not limited based on the type of source of the text and the type of the text being captured by the image capture device. The block of text 102 may be chosen by a user. As one example, if the text is on an electronic display, the user may select the text via the electronic device and manually take a picture of the display. As another example, the user may choose a portion of the text and scan the page. As another example, the block of text 102 may simply be a selection of a sentence, paragraph, page, chapter, or another logical grouping of the text that is automatically determined by the image capture device 104. As another example, before capturing the image of the printed text, the user may indicate (e.g., underline, highlight, bracket, etc.) the portion of the printed text for which the user desires a synthesized image sequence.

Figure 2:
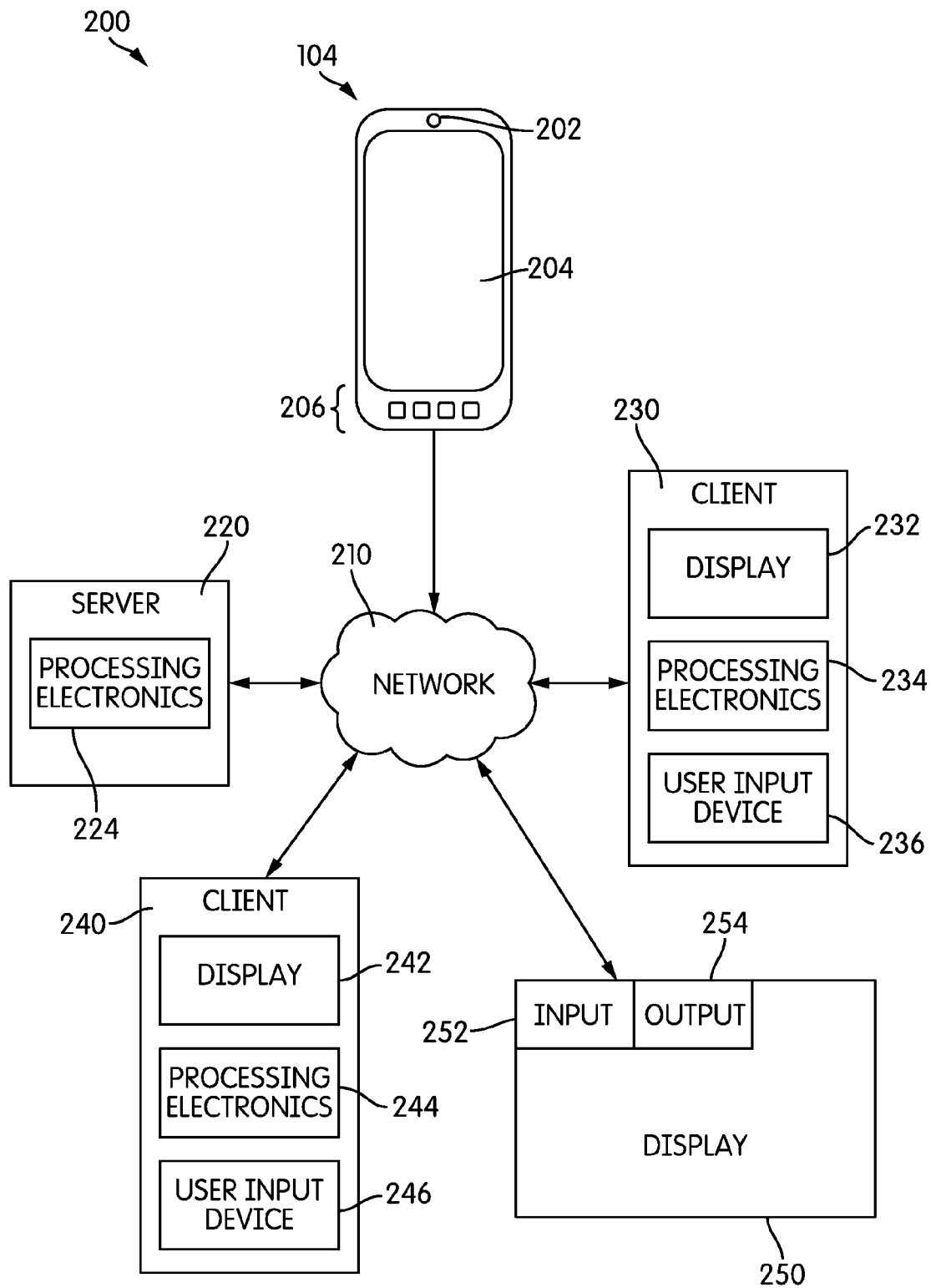
FIG. 2 is a schematic diagram of a server, client, image capture device, and a display connected over a network and configured for using the systems and methods of this disclosure, shown according to an exemplary embodiment.

Referring now to FIG. 2, a block diagram of a system 200 for executing the systems and methods of the present disclosure is shown, according to an exemplary embodiment. System 200 includes an image capture device 104 for capturing images of text. The image capture device 104 is further connected to a network 210 for sending the images of text. The image capture device 104 is shown as a mobile phone; but may be any other type of electronic device for capturing images as described in FIG. 1. For example, the image capture device may be a camera configured to connect via a wired or wireless connection with a laptop or personal computer, which then connects to the network 210. As another example, the image capture device may be a scanner that has a wired or wireless connection to the network 210.

The image capture device 104 as shown in FIG. 2 includes a camera 202 configured to capture the image of text. The image capture device 104 (e.g., mobile phone, digital camera, personal digital assistant, scanner, etc.) may further include a display 204 which a user may use to view the captured image of text. The image capture device 104 further includes user input devices 206 (e.g., buttons) that allow a user to control the image capture device 104 (e.g., to capture the images of text, to select portions of the image of text, to save the images of text, to send the images of text to network 210, etc.). The user input devices 206 may include a keypad, keyboard, trackball, mouse, soft button, or other interfaces. The images of text may be stored in a memory of the image capture device 104 or output to another device for interpreting the images of text. While the image capture device 104 is depicted as communicating with a client 230, 240 over the network 210, according to various embodiments, the image capture device 104 may incorporate or be coupled to the client 230, 240 (e.g., mobile phone, personal digital assistant, etc.) or may be wired or coupled to the client 230, 240 (e.g., connecting a digital camera or scanner to a personal computer) rather than communicating with the client 230, 240 over the network 210.

The network 210 may be a network such as a local area network (LAN), a wide area network (WAN), the Internet, or a combination thereof. The network 210 connects the image capture device 104, a server 220, one or more clients 230, 240, and a display 250. According to various exemplary embodiments, the system 200 may include any number of image capture devices, servers, clients, and displays. For example, the embodiment of FIG. 2 illustrates two clients and a display; the system 200 may include only clients that request synthesized image sequences, only displays that are configured to receive a synthesized image sequence, or any combination thereof.

The system 200 is shown to include a server 220. The server 220 includes processing electronics 224. According to one embodiment, the server 220 and more particularly the processing electronics 224 are configured to receive an image of text from an image capture device 104 via the network 210. The server 220 and processing electronics 224 analyze the image of text and generate a model information associated with the text. The server 220 and processing electronics 224 may then generate (e.g., render, etc.) a synthesized image sequence (e.g., video clip) based on the model information. The server 220 then provides the synthesized image sequence to the display 250 or the clients 230, 240 for output to a user. The processing electronics 224 are configured to generate the model information and synthesized image sequence as shown in greater detail in FIG. 3. The server 220 may be configured to automatically generate a model information or synthesized image sequence in response to receipt of an image of text, or may be configured to wait for further user input or a given amount of time before generation of the model information or synthesized image sequence. According to another embodiment, the server 220 is configured to receive a machine readable format version of the image of the text. For example, the image capture device 104 or the client 230, 240 may translate the image of the text to a machine readable format, for example, via optical character recognition, and then send the machine readable format version to the server 220.

The server 220 may be configured to receive one or more preference files in addition to the images of text. The preference files are files that include user display preferences regarding the synthesized image sequences. For example, the preference files may indicate a preference in the type of character or person displayed in a synthesized image sequence, a setting shown in the background of the synthesized image sequence, or otherwise. The processing electronics 224 are configured to receive the preference files and to use the preference files for generation of the synthesized image sequence.

The server 220 may be configured to receive a second image from the image capture device 104 or another source. The second image may be of more text, of auxiliary information relating to the text, of a character, or of a setting. For example, the server 220 may receive an additional passage of the text, an image of an ISBN number of a book, a title of an article or book, a bar code, or another identifier. The server 220 and processing electronics 224 may be configured to interpret the image of the auxiliary information.

System 200 further includes multiple clients 230, 240 as described above. The clients 230, 240 are configured to request or receive synthesized image sequences from the server 220. In one embodiment, the clients 230, 240 request the server 220 to create the model information or synthesized image sequences. In another embodiment, the server 220 is configured to send synthesized image sequences to the clients 230, 240 upon receipt of a request or images from the image capture device 104 or another device. The clients 230, 240 may be clients that want to order the model information or synthesized image sequences as part of a subscription, according to one embodiment. It should be understood that the clients 230, 240 may interact with the system 200 in various ways. For example, the clients 230, 240 may be configured to be any of the devices in the subsequent figures for interacting with the various systems of the present disclosure.

While the clients 230, 240 and the display 250 are shown as separate devices and described as such in the embodiment of FIG. 2, the clients 230, 240 in the system 200 may be the same device as the image capture device 104, or the display 250 may be the display 204 of the image capture device 104. For example, the image capture device 104 may provide an image of text to the server 220 and then request the resulting synthesized image sequence back from the server 220. In this instance, the image capture device 104 serves as the client. In another embodiment, the image capture device 104 may transmit device information to the server 220 in addition to the image of text indicating a desire to send the resulting synthesized image sequence to a designated client 230. In one embodiment a client 230 or server 220 may transmit the synthesized image sequence to a designated display 250. It should be appreciated that any combination of servers, image capture devices, clients, and displays may be implemented in the system 200 without departing from the scope of the present disclosure.

The clients 230, 240 are shown to include a display 232, 242, processing electronics 234, 244, and a user input device 236, 246. The display 232, 242 is configured to display the synthesized image sequences to the user. The functionality of the display 232, 242 is described in greater detail with reference to the display 250 below.

The processing electronics 234, 244 may be configured to generate a request to the server 220 for one or more synthesized image sequences. The processing electronics 234, 244 may be further configured to format the synthesized image sequences for display on the display 232, 242. According to one embodiment, the processing electronics 234, 244 may be configured to at least partially generate the synthesized image sequences (e.g., to perform the task of the processing electronics 224 of the server 220). For example, the processing electronics 234, 244 may be configured to translate the image of the text into a machine readable format. For another example, the processing electronics 234, 244 may be configured to generate the model information and send the model information to the server 220 for rendering. For yet another example, the processing electronics 234, 244 may be configured to receive the model information generated by the server 220 and to render the model information into a synthesized image sequence. The processing electronics 234, 244 may further be configured to otherwise manage information related to the synthesized image sequences.

The user input device 236, 246 is configured to receive a user input relating to the synthesized image sequences. For example, the user input device 236, 246 may allow a user to request a synthesized image sequence. As another example, the user input device 236, 246 may allow a user to provide a preference file or preference file data for transmission to the server 220. As yet another example, the user input device 236, 246 may allow a user to manipulate or recode the model information.

The system 200 further includes a display 250. The display 250 is shown located remotely from a client device instead of part of a client device 230, 240 as described above. The display 250 is shown as connected to the network 210. According to various exemplary embodiments, the display 250 may be part of the image capture device 104 (e.g., a display on a mobile phone or other electronic device used to capture the image of text) or may be connected to another device not otherwise part of the system 200 (e.g., a PC, laptop, another mobile phone, television screen, etc.). For example, the display 250 may be coupled to a camera of an image capture device. As another example, the display 250 may be coupled to a mobile phone. As yet another example, the display 250 is located remotely from the components of the system 200 over the network 210. As yet another example, the display 250 may be any kind of touchscreen display.

The display 250 includes an input 252 and an output 254. The input 252 receives a synthesized image sequence or other synthesized image sequence from the server 220 (or client 230 and/or client 240) via the network 210. The display 250 is configured to format the synthesized image sequence and present the synthesized image sequence on the display. According to an exemplary embodiment, the server 220 may be configured to determine the type of output the display 250 can provide and to format the synthesized image sequence accordingly for display on the display 250. For example, if the display 250 is capable of displaying 3D images, the server 220 may be configured to generate 3D images or objects as at least part of the synthesized image sequence. As another example, if the display 250 is capable of high-definition (HD) display, the server 220 may be configured to generate an appropriate synthesized image sequence for the display.

The output 254 of the display 250 may provide the server 220 and other components connected to the network 210 with information relating to the display of the synthesized image sequence. Such information may include display information, screen resolution, digital content protection, communication format (e.g., digital or analog), etc. For example, display settings of the display 250 may be output to the server 220, and the server 220 may use the display settings to configure the synthesized image sequence generated by the server 220. Other display information may include, for example, information relating to the success or failure of display of a particular synthesized image sequence, the number of views of the synthesized image sequence, and other usage information.

The system 200 may be configured to share information across the various components. For example, a created synthesized image sequence may be shared with multiple users (e.g., clients) instead of just the user that requested the synthesized image sequence. Such sharing may include sharing the actual synthesized image sequence, one or more files including data that allows another system to recreate the synthesized image sequence (e.g., a preference file, model information, etc.), or any other information relating to the synthesized image sequence and its generation.

Figure 3:
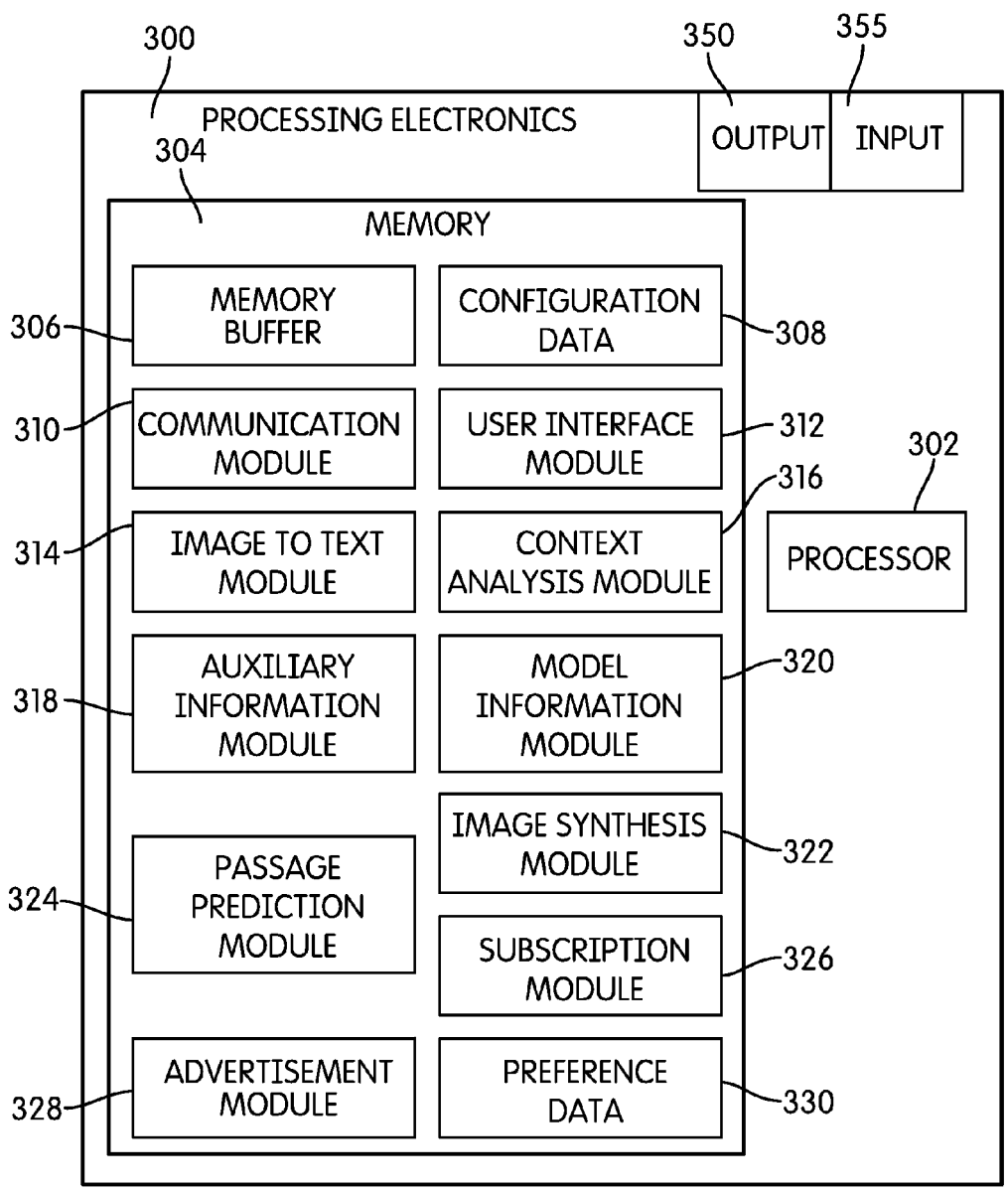
FIG. 3 is a detailed block diagram of processing electronics, shown according to an exemplary embodiment.

Referring now to FIG. 3, a more detailed block diagram of processing electronics 300 for completing the systems and methods of the present disclosure is shown, according to an exemplary embodiment. The processing electronics 300 may be the processing electronics of server 220 or clients 230, 240 of FIG. 2, according to an exemplary embodiment. The processing electronics 300 are generally configured to receive an image of text from an outside source (e.g., an image capture device). The processing electronics may further be configured to receive supplemental information (e.g., one or more preference files, other images of text or pictures, auxiliary information, contextual cues, etc.). The processing electronics 300 are then configured to generate a model information using at least some of the received information. The processing electronics 300 are then further configured to generate a synthesized image sequence (e.g., video clip) using the model information and, according to various embodiments, some of the received information and to provide the synthesized image sequence as an output to a client.

The processing electronics 300 includes a processor 302 and memory 304. The processor 302 may be implemented as a general purpose processor, an application specific integrated circuit (ASIC), one or more field programmable gate arrays (FPGAs), a group of processing components, or other suitable electronic processing components. The memory 304 is one or more devices (e.g., RAM, ROM, Flash memory, hard disk storage, etc.) for storing data and/or computer code for completing and/or facilitating the various processes described herein. The memory 304 may be or include non-transient volatile memory or non-volatile memory. The memory 304 may include data base components, object code components, script components, or any other type of information structure for supporting the various activities and information structures described herein. The memory 304 may be communicably connected to the processor 302 and includes computer code or instructions for executing one or more processes described herein (e.g., the processes shown in FIGS. 4-17).

The memory 304 includes a memory buffer 306. The memory buffer 306 is configured to receive data via a network (e.g., network 210) through an input 355. The data may include image data (e.g., images of text received by the processing electronics 300), preference data (e.g., from a client or other electronic device), or other data. The data may be stored in the memory buffer 306 until the memory buffer 306 is accessed for data by the various modules of the memory 304. For example, the image to text module 314, context analysis module 316, and auxiliary information module 318 may access the memory buffer 306 for images of text received.

The memory 304 further includes configuration data 308. The configuration data 308 includes data relating to the processing electronics 300. For example, the configuration data 308 may include information relating to a retrieval process of images (e.g., when the module generation module 320 or image synthesis module 322 requests a series of images or objects to create models or images, the configuration data 308 may be used to generate a request to transmit to an outside source for the images or objects, or the configuration data 308 may be used to search for the images or objects in a database local to the processing electronics 300). As another example, the configuration data 308 may be used to configure communication between the various modules of the processing electronics 300 (e.g., to configure the image to text module 314 to provide a text input to modules 316, 318 for analyzing the text).

The memory 304 further includes a communication module 310. The communication module 310 is configured to provide communication capability with other devices via the output 350. For example, the communication module 310 may be configured to take a finished synthesized image sequence generated by the processing electronics 300 and to format the synthesized image sequence for transmission via the output 350. The communication module 310 may include logic for supporting communications protocols (e.g., internet protocol, file transfer protocol, etc.) or supporting server-client or peer-to-peer network relationships.

The memory 304 further includes a user interface module 312. The user interface module 312 is configured to receive a user input from the input 355 and to interpret the input for the other modules of the processing electronics 300. For example, the user interface module 312 may receive a request for generation of a synthesized image sequence via the input 355 and may be configured to use the request to provide commands to the various modules of the processing electronics 300 for generating the synthesized image sequence.

The memory 304 is shown to include various modules 314-326 for executing the systems and methods described herein. The various modules 314-326 are configured to receive images of text, preference data, and other information from input 355 and/or a local database and formatted by modules 306-312. The various modules 314-326 are then used to generate model information or one or more synthesized image sequences for transmission to an outside source (e.g., a display).

The image to text module 314 is configured to receive an image of text from an outside source and to interpret the text in the image. The image of text may be an image taken by a camera, scanner, or other electronic device and sent from the device to the processing electronics 300 either directly or via a network. The image to text module 314 is configured to identify text in the image and to generate an interpretation of the text in a machine-readable format. The other modules of the processing electronics 300 can then use the text in its machine-readable format to interpret and analyze the text and to create synthesized image sequences based on the machine readable format of the text.

In one exemplary embodiment, the image to text module 314 may translate the text in the image using optical character recognition (OCR). In another embodiment, the image to text module 314 may translate the text in the image using a handwriting recognition engine. The image to text module 314 may be configured to translate any type of text. For example, the text may be typeset (e.g., text created by a typewriter, printing press, computer application, etc.) or the text may be handwritten, and the image to text module 315 may distinguish the type of text and decide which translation technique to use. In one embodiment, the image to text module 314 may be configured to interpret shorthand or longhand notation in either typeset or handwritten form.

In one embodiment, the image to text module 314 may be implemented for any type of language (e.g., English, French, German, Chinese, Sanskrit, Morse code, Braille, hieroglyphs, etc.). The image to text module 314 may further include a translator configured to translate the text in the image from one language to another (e.g., if text in an image is French, then the French version of the text is translated into a machine-readable format, then translated again from French to another language such as English). The image to text module 314 may receive instructions to translate between languages. For example, a preference data file may include an indication for a preferred language, to subtitle the synthesized image sequence in the preferred language while providing dialogue in the native language, or to provide dialogue in the preferred language (i.e., "dub" the dialogue).

The context analysis module 316 is configured to receive text in a machine-readable format from the image to text module 314. The context analysis module 316 is configured to interpret the received text. In one embodiment, the interpretation of the text includes analyzing the text for contextual cues. The contextual cues may relate to a setting, a character, a pose or action, and other defined objects as identified by the text. For example, individual words may be identified by the context analysis module 316 that relate to a specific location or setting (e.g., $16^{th}$ Century England, Wis., a house, Main Street, etc.), a specific person (e.g., Shakespeare, Einstein, mother, father, etc.), a specific action (e.g., running, talking, exercising, etc.), a pose (e.g., standing, sitting, etc.) or otherwise. As another example, a series of words may be identified that relate to a specific action and specific object (e.g., a person running, a car driving down a road, a phone ringing, etc.). In other words, the context analysis module 316 is configured to provide context to the literal interpretation of actions described by the text.

In addition to providing context to the literal interpretation of the text, the context analysis module 316 may determine an origin of the text. The origin of the text may be determined by identifying any slang or dialect in the words, by determining if the text has appeared in any books, plays, or other forms of media, or otherwise. For example, upon analysis of the text, it may be determined that the origin of the text is from a Shakespearean play. A setting or location of $16^{th}$ Century England may then be determined by the context analysis module 316. As another example, if the text includes names of historical figures from an era and location, the era and location may be set as the setting or location (e.g., the name Julius Caesar may lead to an identification of ancient Rome as a setting or location, the name Abraham Lincoln may indicate a setting of the United States Civil War Era, etc.).

The auxiliary information module 318 is configured to determine auxiliary information related to the image of text. Auxiliary information may include a source of the text or image associated with the text (e.g., a book or magazine which is the origin of the text). Auxiliary information may include, for a given image of text, another passage in the source of text (e.g., if an image of one page of a book is received, another page of the book may be used to determine auxiliary information), information associated with the author of the source of the text, and other textual sources associated with the source of the text (e.g., other texts in the same series as the source text, scholarly analyses of the source text, etc.).

The auxiliary information module 318 is configured to receive an input of text from the image to text module 314 and/or an image or text from an outside source. The auxiliary information module 318 is configured to use the text and/or images to determine auxiliary information relating to the text in an image. In one embodiment, the image to text module 314 may be configured to distinguish text in an image that is not part of a passage or block of text. For example, an image of a whole page of a magazine may be captured. The image to text module 314 may interpret all text on the page, which may include header and footer information (e.g., the name of the magazine, title of an article, page numbers, etc.). The auxiliary information module 318 is configured to receive all of the interpreted text and to identify which of the text represents auxiliary information and which of the text is part of the main text.

Further, the auxiliary information module 318 may receive an image including text, symbols, and other identifiers, and is configured to use the identifiers to determine auxiliary information. For example, the images of text may include actual images in addition to the text. The auxiliary information module 318 is configured to identify all non-text objects in the image and to identify the non-text objects. For example, a picture of a basketball included with text in an image may be identified, and the auxiliary information module 318 may conclude the block of text is about basketball. According to one embodiment, the auxiliary information module 318 may receive an image of a character, setting, object, scenery, etc.

The auxiliary information module 318 may work in conjunction with the context analysis module 316 to determine context of the text. For example, a title of an article may be identified by the auxiliary information module 318. The context analysis module 316 may then use the title of the article to look for contextual information relating to the article. For example, the context analysis module 316 may use the title to determine a setting or location relating to the title (e.g., a title including the words "Romeo" and "Juliet" may lead to the identification of $16^{th}$ century Verona, Italy as a location). The auxiliary information module 318 may then search for and receive map information related to the determined setting (e.g., retrieve map data of Verona, Italy). As another example, the context analysis module 316 may look up a magazine that printed an article with the title determined by the auxiliary information module 318, and use information from the magazine to determine a setting or other property.

As another example, the auxiliary information module 318 may use information from the context analysis module 316. The context analysis module 316 may provide determined contextual cues to the auxiliary information module 318. The contextual cues are then used to determine auxiliary information. For example, the contextual cues may be used to determine a source of the text (e.g., type of book, magazine, etc.).

In one embodiment, the auxiliary information module 318 may receive an image of a bar code (e.g., representing the ISBN number of a book, representing the ISSN number of a magazine, a UPC label, etc.). The image of the bar code may be sent along with an image of text (i.e., in the same image or in a second image). The auxiliary information module 318 may interpret the bar code to determine the origin of the image of text, and provide the information to the context analysis module 316 to determine contextual cues relating to the source. In another embodiment, an ISBN number of a book may be received by the auxiliary information module 318 (the number being translated by the image to text module 314), and the ISBN number may be used to determine the origin of the image of text.

The model generation module 320 is configured to receive data from the context analysis module 316 (e.g., contextual cues), auxiliary information module 318 relating to the context and other text information, and preference data 330. The model generation module 320 may further receive contextual cues and auxiliary information from an outside source via the input 355 instead of or in addition to the modules 316, 318. Using the data, the model generation module 320 creates the model information (e.g., markup file, stream, etc.) from the data. The model information general includes instructions (e.g., computer code, mathematical representations, etc.) relating to the orientation, motion, and interaction of the objects (e.g., characters, props, etc.) and scenery. According to one embodiment, the model information includes object location information (e.g., where an object is in the scene, orientation of the object in relation to other objects, orientation of the object in relation to the scenery, etc.). For example, the object location information may include instructions indicating that a character is near a window. According to another embodiment, the model information includes object activity information (e.g., what the object is doing). For example the object activity information may include instructions indicating that the character is raising his arms and instructions that the window is opening. According to other embodiments, the model generation module 320 may generate skeletons or wireframes of the setting, characters, and objects, and the image synthesis module 322 may then render imagery over the skeletons. The wireframes of the settings may be generated based on map data received by the auxiliary information module 318.

According to one embodiment, the creation of the model information includes the process of determining types of images and objects to use to create the synthesized image sequence, receiving the images and objects from a database or outside source, and creating the model information using the images and objects. The model generation module 320 may create the model information based on various types of settings. For example, the processing electronics 300 may receive instructions for a type or format in which the model information should be created. The model generation module 320 may generate model information having instructions for image sequences having two dimensional (2D) or three dimensional (3D) (or any combination thereof) objects and scenery. As another example, the processing electronics 300 may have a preset format to use for generation if one is not provided. It should be understood that the type of model information generated by the model generation module 320 is not limited by the scope of the present disclosure.

In another embodiment, the model generation module 320 is configured to create a model information based on a series of images and objects. As one example, a background image (e.g., scenery) may be set to display throughout the synthesized image sequence. Then, a series of objects may be rendered for display (e.g., by the image synthesis module 322) in the synthesized image sequence. The objects may include characters (e.g., people identified and described by the text) or objects identified by the text (e.g., car, ball, house, etc.). The model information may contain instructions for moving the objects based on any number of motion algorithms. As a simple example, one object may move from left to right at a rate of 30 pixels per second. As a more complex example, the model information may include information and instructions use to generate a synthesized image sequence having multiple characters in a scene, each of which with a distinct "walking" speed as they move around in the scene. Further, each object may be animated. For example, each object may have multiple components, wherein each component may be moved or adjusted. As one example, a character can be made to look like he or she is walking by moving the legs of the character.

One possible object to render in the synthesized image sequence may be a character (e.g., a person). The character may be a generic image of a character according to one embodiment. For example, the model generation module 320 may provide instructions for default or stock characters. According to another embodiment, the character may be based on a description of the character in the text. The contextual cues determined by module 316 may be used to edit the appearance of the character in the model information. For example, if a character is said to have blonde hair, the model information may provide instructions to render the character with blonde hair. As another example, if a character is a celebrity character, an actual image of the celebrity may be used as the character.

The character may be based on a user selection according to another embodiment. For example, a user preference from a preference file or another input may be used to determine the appearance of the character. The preference file may indicate a preference for a specific person to appear, celebrity or otherwise (e.g., a family member of the user, friend of the user, the user, etc.). Alternatively, the preference file may indicate a preference for only a type of person (e.g., people with blonde hair, only females, only males, only people of a particular race or ethnicity, etc.) The same contextual cues and user preference information may be used to determine the appearance of other objects and the background image or scenery in the synthesized image sequence as well.

The image synthesis module 322 is configured to receive model information from the model generation module 320. The image synthesis module 322 may further receive data from context analysis module 316 (e.g., contextual cues), auxiliary information module 318 relating to the context and other text information, and preference data 330. The image synthesis module 322 may further receive contextual cues and auxiliary information from an outside source via the input 355 instead of or in addition to the modules 316, 318. Using the data, the image synthesis module 322 generates (e.g., renders, creates, etc.) the synthesized image sequence (e.g., video clip) from the model information and other data, if any. The rendering process may use techniques or software that are similar to those used for video game rendering. According to one embodiment, the creation of the image sequence includes the process of determining types of images and objects to use to create the sequence, receiving the images and objects from a database or outside source, and creating the sequence using the images and objects. The image synthesis module 322 may create the synthesized image sequence based on various types of settings. For example, the processing electronics 300 may receive instructions for a type or format in which the synthesized image sequence should be created. As another example, the processing electronics 300 may have a preset format to use for generation if one is not provided. It should be understood that the type of synthesized image sequence generated by the image synthesis module 322 is not limited by the scope of the present disclosure.

In one embodiment, the image synthesis module 322 is configured to create a video based on a series of images (e.g., frames). The image synthesis module 322 may create a video with a frame rate of 24 frames per second (FPS), 30 FPS, 72 FPS, or any other speed. The video may further include any number of transitional elements (e.g., fading in or out, panning across images, other slideshow effects, etc.). In another embodiment, the image synthesis module 322 may be configured to generate a three dimensional (3D) video. The 3D video may be configured for display on an appropriate monitor.

The objects rendered in the scene of the synthesized image sequences may be two dimensional (2D) or three dimensional (3D), according to an exemplary embodiment. As one example, after rendering a background 2D image in the scene, one or more 3D objects may be rendered in the scene. As another example, after rendering a background 3D image in the scene, one or more 3D objects may be rendered in the scene. The objects and images rendered in the scene may be 2D, 3D, or a mixture of both. The objects rendered in the scene may then move on a 2D axis or 3D axis, according to an exemplary embodiment.

According to various embodiments, some steps and elements of the systems and methods described in this disclosure may occur in the model generation module 320, the image synthesis module 322, or any combination thereof. For example, object information, character information, scenery information, setting information, etc. may be incorporated into the synthesized image sequence by the model generation module 320 or the image synthesis module 322. According to one embodiment, character information provided as contextual cues, auxiliary information, or a user preference may be incorporated into the model information as model generation module 320 generates the model information. According to another embodiment, character information may be incorporated into the synthesized image sequence as the image synthesis module 322 renders the synthesized image sequence. According to one embodiment, the model generation module 320 may incorporate size or motion characteristics of the character into the model information, and the image synthesis module 322 may render appearance characteristics into the synthesized image sequence. According to another embodiment, the model generation module 320 may generate model information having character, scenery, or setting instructions based on the source text, contextual cues, and auxiliary information; however, the image synthesis module 322 may render the synthesized image sequence based on instructions in a preference data 330.

In one embodiment, the model generation module 320 and image synthesis module 322 may be configured to include speech. For example, the synthesized image sequence may include narration and a character rendered in the synthesized image sequence may have dialogue, e.g., the character may speak some of the text. The context analysis module 316 may provide an indication to the model generation module 320 and image synthesis module 322 about which text may be dialogue. The dialogue of the synthesized image sequence may be in a different language than the text. For example, image to text module 314 may translate a foreign language text to the user's native language so that the dialogue is spoken in the user's native language. Other sounds (e.g., sound effects) may be included in the synthesized image sequence that fits the settings and actions shown (e.g., gunfire in a synthesized image sequence that is recreating a war scene).

In one embodiment, the images of text received by the processing electronics 300 may be part of a comic book, graphic novel, slideshow, or other illustration that include non-text elements. The image synthesis module 322 may receive, in addition to contextual cues and auxiliary information, information relating to the other objects shown in the illustration and may be configured to use the other objects to create the synthesized image sequence. For example, objects shown in a comic book (e.g., a flying superhero, a laser beam, other special effects) may be animated by the image synthesis module 322. The objects as shown in the comic book may be used to generate the objects in the synthesized image sequence or the model generation module 320 or image synthesis module 322 may access a database and search for similar objects to use. Map data received by the auxiliary information module 318 may be used to generate the background or setting images.

The image synthesis module 322 may create, in order to supplement the synthesized image sequence, various links and other interactive features in the synthesized image sequence. Such interactive features may be used with a display such as a touchscreen, or used when the display is connected to an electronic device that includes a user input that can control playback of the synthesized image sequence. For example, the synthesized image sequence may include a link that, upon touching on a touchscreen or the pressing of a button on a user input, may take the viewer of the synthesized image sequence to a website related to the content of the synthesized image sequence.

The memory 304 is further shown to include preference data 330. Preference data 330 may either be stored in a database local to or remotely from the processing electronics 300, or may be received via a preference file transmitted to the processing electronics 300. Preference data 330 relates to model information preferences and synthesized image sequence preferences for a user. Using the preference data, the model information generated by the model generation module 320 may be modified or personalized from the default settings or from the auxiliary and contextual information. Similarly, using the preference data, the image synthesis module 322 may modify and personalize the synthesized image sequence generated for a specific user. For example, the image synthesis module 322 may override instructions in the model information, contextual cues, auxiliary information, etc. based on the preference data. A preference file received by the processing electronics 300 may be sent by a reader of the text or may be a preference file from another user or device (e.g., received over a network). For example, the processing electronics 300 may receive one or more preference files from a friend or classmate of the user. The preference file may be generated from scratch based on user input or may be generated based on a previously generated preference file. The previously generated preference file may have been generated by the user or by another.

The preference data 330 may include character information. For example, if a user prefers a specific type of character (e.g., characters with blonde hair, famous people, only women, only men, family members, etc.), the preference data 330 may include such information. Using the preference data 330, the image synthesis module 322 may replace a character who is to appear in a synthesized image sequence and replace him with a character specified by the preference data 330. For example, in a video clip about a Shakespearean play, the preference data 330 may be used to insert family members into the video clip instead of the typical characters.

The preference data 330 may include scenery information (e.g., background information). For example, if a user prefers a specific type of scenery, the model generation module 320 or the image synthesis module 322 may implement the preference. For example, in a video clip, if the preference data 330 indicates a preference to have a setting in New York City, the video clip may be set in New York City regardless of the other content of the video clip.

The preference data 330 may include linguistic information. For example, if a user prefers a specific type of language or dialect in the video clip, the model generation module 320 or the image synthesis module 322 may implement the preference. This linguistic information may be used to replace dialogue or other representations of text in the synthesized image sequence.

The preference data 330 may include time period information. For example, if a user prefers a synthesized image sequence "happens" in a specific time period (e.g., ancient Rome, 16$^{th}$ Century England, present day, etc.), the model generation module 320 or the image synthesis module 322 may implement the preference regardless of the other contextual cues and auxiliary information used to create the synthesized image sequence.

The preference data 330 may include content rating information. For example, if a user prefers not to see any "mature" content regardless of the content of the text, the model generation module 320 may be configured not to model such content, and the image synthesis module 322 may be configured to remove such content from the video clip. As another example, if a user prefers the video clip to be viewed by children, the model generation module 320 or the image synthesis module 322 may be configured to create a video clip that includes cartoon characters, animation, or other content that may be easier related to children.

The preference data 330 may include image format information. For example, the image format information may include instructions or logic specifying or indicating the resolution or quality of the synthesized image sequence (e.g., high-definition, enhanced definition, standard definition, low-definition, 1080×1920 pixels, 720×1280 pixels, 480×704 pixels, 480×640 pixels, etc.). The image format information may specify the format of the image synthesis file (e.g., MPEG-2, MPEG-4, H.264, VP8, etc.). The image format information may include instructions or logic specifying or indicating still images or video images; two-dimensional (2D) or three-dimensional (3D) images; cartoon animation or realistic rendering; color, sepia tone, monochromatic, or grayscale images.

The preference data 330 may be shared across a number of users, according to an exemplary embodiment. For example, the preference data 330 may be stored in a preference file. The preference file may have been previously created or may be created by the processing electronics 300. The preference file may then be shared with other users and other processing electronics configured to receive requests from the other users.

The passage prediction module 324 is configured to schedule generation of synthesized image sequences based on reader behavior. The passage prediction module 324 receives a notification of receipt of an image of text to be used for synthesized image sequence generation. The passage prediction module 324 may be used to determine when to create the synthesized image sequence.

The passage prediction module 324 may be part of a prediction subsystem of the systems of the present disclosure. The prediction subsystem may be able to predict or anticipate text that is about to be read by a person. For example, the user may be reading a first textual passage in an article or book on an electronic device (e.g., an electronic book) and the electronic device may be configured to "jump ahead" and determine a second textual passage which text is about to be read. In this case, both the first and second textual passages are in an electronic format. Upon determining such text, an image of the text may be automatically taken by the electronic device and sent to the processing electronics 300, along with an indication of how soon the reader of the text will reach the text (e.g., reader information). The passage prediction module 324 may receive text source information from the auxiliary information module 318 and predict when a user will reach a subsequent (e.g., second) textual passage. For example, if a user (e.g., a student) takes a picture of printed text from the book "To Kill a Mockingbird," the auxiliary information module 318 may identify the source of the text, and the passage prediction module 324 may predict when the reader will reach a subsequent passage in the book. In this case, the first textual passage is in a printed format, but the synthesized image sequence is generated based on an electronic format version of the second passage. The passage prediction module 324 may be configured to receive the image of text and the reader information and use the reader information to determine when to generate a synthesized image sequence for a particular image of text. The passage prediction module 324 predicts when a reader will reach a particular textual passage and generates a synthesized image sequence for display for when the reader reaches the upcoming textual passage.

The passage prediction module 324 may further be configured to determine a textual passage that the reader is reading. According to one embodiment, the passage prediction module 324 may determine that the reader is reading the textual passage that is being displayed. According to another embodiment, the passage prediction module 324 may determine that the reader is reading the textual passage of which the reader captured an image. According to various other embodiments, the passage prediction module 324 may determine the textual passage that the reader is reading based on receiving a user input (e.g., bookmarking a page, turning a page, touching a portion of text on a touchscreen, providing a page number, providing a chapter and verse, etc.).

According to one embodiment, the prediction of when a reader will reach a particular textual passage may be based on knowledge of the amount of text between the textual passage the reader is currently reading and the textual passage provided to the passage prediction module 324. The amount of text may be measured by the number of pages, paragraphs, sentences, words, or letters. According to another embodiment, the reading speed of the reader may be used to obtain the prediction. The reading speed may be based on a number of pages per minute, an average number of pages per minute, words per minute, density of the text, etc. The reading speed may be determined by the passage prediction module 324, by the device capturing the images of text, or otherwise. In one embodiment, the image capture device or another device may track user movement (e.g., eye tracking) and use the movement information to determine a reading speed or other property that may be used by the passage prediction module 324. According to another embodiment, the passage prediction module 324 may determine a textual passage being currently read by the reader based on a previously determined textual passage being read by the reader at that time, the reading speed of the reader, and an elapsed time.

The passage prediction module 324 may be configured to predict which textual passage will be read by a reader and will have imagery synthesized based on an image synthesization speed of the processing electronics 300 (e.g., the speed at which the processing electronics 300 creates synthesized image sequences). For example, passage prediction module 324 may not select a passage for synthesization that is within a given space (e.g., two pages, ten paragraphs, etc.) of the currently read text because the model generation module 320 and the image synthesis module 322 will not have time to generate a model and render imagery.

The passage prediction module 324 may be configured to determine video quality based on the reader information. For example, it may be determined that a reader is about to read a specific passage in two minutes based on a reading speed of the reader. The passage prediction module 324 may then project a quality of a synthesized image sequence that can be generated in two minutes. Further, the passage prediction module 324 may always command the processing electronics 300 to generate a "simple" version of a synthesized image sequence for an image of text upon receipt of the text. The simple version of the synthesized image sequence may be generated using a resource-limited schedule (e.g., on a schedule that minimizes time but still produces an acceptable quality). The simple version of the synthesized image sequence may then be transmitted to a display along with an indication that a better quality synthetic image sequence will be generated by the processing electronics 300. The better quality synthesized image sequence is then sent to the display when it is generated. That way, if a reader reaches a specific passage, a simple version of a synthesized image sequence may always be available to the reader, and a better quality synthesized image sequence may be available if there is enough time to generate the synthesized image sequence for the reader. The quality level of the synthesized image sequence may be changed based on a predicted time until the reader reaches the textual passage in question, according to an exemplary embodiment. This process may also include logic for determining if there is enough time to regenerate the synthesized image sequence at the improved quality. The logic may use the reading speed or amount of text as described above.

The passage prediction module 324, when transmitting the synthesized image sequence to a display, may be configured to generate an indicia to the display. The indicia may simply be used to alert the display that the synthesized image sequence is available for viewing in the future. The passage prediction module 324 may further transmit other indicia to the display. For example, the passage prediction module 324 may alert the display that a synthesized image sequence is currently being created and may provide a predicted time until the synthesized image sequence will be sent to the display, or a predicted time until the synthesized image sequence will be ready for viewing on the display. According to various embodiments, the indicia may be presented to the reader visually (e.g., shown on a screen), audibly (e.g., spoken word, alert sound, etc.), or tactilely (e.g., via vibration, haptic feedback, etc.).

In one embodiment, after the processing electronics 300 generates a synthesized image sequence for a first image of text, the passage prediction module 324 determines a second image of text or textual passage about to be read by a reader and alerts the processing electronics 300 to create a synthesized image sequence for the second image of text or textual passage.

The selection of the textual passage to be used for creation of a synthesized image sequence for future viewing by a reader may be done in various ways. In one embodiment, the textual passage is chosen via the potential interest to the reader of the textual passage. In other embodiments, the textual passage may be based on a verb within the textual passage, the number of action verbs within the textual passage, an adjective or number of action adjectives within the textual passage, a character within the textual passage, or another indicator, contextual cue, or linguistic characteristic of the textual passage.

The activities of the passage prediction module 324 are performed in parallel with a user reading the text in question, according to an exemplary embodiment. According to one embodiment, the passage prediction module 324 selects text such that processing electronics 300 provide synthesized image sequences to the user in a substantially just-in-time manner. According to another embodiment, the passage prediction module 324 may continue to read ahead to build up a library of synthesized image sequences. According to another embodiment, the passage prediction module 324 may continue to read ahead to build up a library of model information, auxiliary information, and contextual cues, in which case only the image rendering need be done on a just-in-time basis. According to another embodiment, the passage prediction module 324 may be configured to generate another synthesized image sequence associated with another predicted textual passage in response to completing generation of a synthesized image sequence. According to yet another embodiment, the passage prediction module 324 may be used to trigger generation (or regeneration with improved quality) of synthesized image sequences while a reader is taking a break from reading. The activities of the prediction subsystem and passage prediction module 324 are described in greater detail in FIGS. 12-14.

The subscription module 326 is configured to handle subscription information related to the synthesized image sequence generation system. For example, the use of the system and processing electronics 300 may be subscription-based (e.g., a user may pay for the service of generating the synthesized image sequences, a user may pay for the service of using the generated model information, etc.). The subscription module 326 may be configured to handle access to the system and processing electronics 300 in such a setup. For example, the subscription module 326 may handle subscriptions to the system (e.g., a user may sign up for and pay for the services described herein, and the subscription module 326 may be used to manage the access to the services for the user). As another example, the subscription module 326 may be configured to handle purchases by a user of the system. As yet another example, the subscription module 326 may be configured to handle output of the model information or the synthesized image sequence (e.g., the subscription module 326 may have a list of users or devices that are subscribed to the system and are configured to receive a specific series of video clips or files used to generate the video clips upon generation of the video clips or files). As yet another example, the subscription module 326 may allow a user to use the system on a per use basis (e.g., the user has to pay for every use of the system or for every viewed synthesized image sequence).

According to one exemplary embodiment, the subscription module 326 is configured to receive payment information in response to access to the system. The subscription module 326 may be configured to process the payment by receiving the payment information (e.g., credit card number) and completing a transaction with a bank using the payment information. In one embodiment, the payment information is received by the subscription module 326 after sharing the model information or the synthesized image sequence. The payment information can be received for each time the model information or synthesized image sequence is exported, or for each time the synthesized image sequence is accessed on a display located remotely from the processing electronics 300. The user may be charged for each use of the synthesized image sequence or associated file, or may be charged on a subscription basis (e.g., charged for use of the model information or the synthesized image sequence for a given time frame such as a day, week, month, etc.).

The advertisement module 328 is configured to handle advertisements associated with the generated video clips. For example, an advertiser may wish to use the system as a way to advertise a product. The advertisement module 328 may be configured to handle interaction between the advertiser and the system and to edit the content of the video clips based on the advertiser preference.

In one embodiment, the advertiser may indicate a preference to display a specific product in a video clip (e.g., the advertiser may have a preference file of its own). For example, there can be product placement in the video clip (e.g., a product such as a beverage may be inserted into the video clip, a particular brand of beverage may be used whenever a beverage is in a video clip, a banner or other text may be inserted into the video clip that promotes a product, etc.).

The advertisement module 328 may further be configured to handle other promotional aspects. For example, the advertisement module 328 may receive information from the other modules of the processing electronics 300 relating to the synthesized image sequence. Such information may include the original source of the text. The advertisement module 328 may use such information to recommend other products to a viewer of the synthesized image sequence. For example, if the synthesized image sequence is generated from a source of text relating to a Shakespearean play, the advertisement module 328 may determine other Shakespearean works to recommend to the viewer or may recommend other adaptations, "remakes," or influential sources of the text. For example, the Taming of the Shrew may trigger a recommendation of Kiss Me Kate, or vice versa. The advertisement module 328 may recommend movies or television shows related to the synthesized image sequence if the image of text used to create the synthesized image sequence comes from a transcript of another movie or television program. The display of the recommendations may occur during the synthesized image sequence, before or after the synthesized image sequence, or via another method (e.g., sending an e-mail or other message to a user independent of sending the synthesized image sequence to the user.

The processing electronics 300 further includes an output 350 and input 355. The output 350 is configured to provide an output to a client, display, or other electronic device as described above. Outputs may include a generated synthesized image sequence, synthesized image sequence information, preference files, etc. The input 355 is configured to receive images of text, preference file information, and other information relating to the generation of synthesized image sequence as described above.

According to an exemplary embodiment, the processing electronics 300 may receive a previously synthesized data file. According to one embodiment, the previously synthesized data file includes a synthesized image sequence and data relating to the synthesized image sequence either generated by the processing electronics 300 or an outside source. According to another embodiment, the previously synthesized data file includes model information. The processing electronics 300 may use the previously synthesized data file to create a new synthesized image sequence. According to one embodiment, the previously synthesized data file may be a data file created for or by a different user.

According to an exemplary embodiment, the processing electronics 300 exports a file that allows another system for another user to generate a synthesized image sequence using the same information the processing electronics 300 used to generate its synthesized image sequence. The file may include the model information, images and objects used to generate the synthesized image sequence, contextual cues, preference files or preference data, auxiliary information, etc. In one embodiment, the file simply includes the actual synthesized image sequence. In another embodiment, the file includes only preference information such as character information, scenery information, linguistic information, time period information, content rating information, and other information that can be used to create the synthesized image sequence.

The processing electronics 300 may be configured to create the file. In one embodiment, the model generation module 320 or the image synthesis module 322 may be configured to create the file using all of the data received from other modules. The file may include information from a user input, according to an exemplary embodiment. The user input may relate to various preferences and may include character information, scenery information, linguistic information, time period information, content rating information, etc.

The processing electronics 300 may be configured to receive an exported file as described above and to use the file to generate a synthesized image sequence. The processing electronics 300, upon receipt of the exported file, may be configured to provide an indication via a display to a device associated with the processing electronics 300 that the file was received. The user of the device may then have the option to request a generation of the synthesized image sequence.

In an exemplary embodiment, the created and exported file may be stored in a database either local to or remotely located from the processing electronics 300. Other devices may then access the database to access the file instead of receiving the file directly from the processing electronics 300, according to an exemplary embodiment. The database may be configured to be searchable based on the content of the file (e.g., searchable by the type of synthesized image sequence format, model information, auxiliary information, contextual cue information, preference information, etc.), the user who generated or uploaded the file, etc. Using the database and the various electronic devices that may connect to the database, a sharing network may be configured that allows preference files and other files relating to synthesized image sequences to be shared between users. The sharing network may be of any suitable structure, for example, client-server, peer-to-peer, etc.

Referring generally to FIGS. 4-17, various processes are shown and described that may be implemented using the systems and methods described herein. The processes of FIGS. 4-17 may be implemented using the system 200 of FIG. 2 and the processing electronics 300 of FIG. 3.

Figure 4:
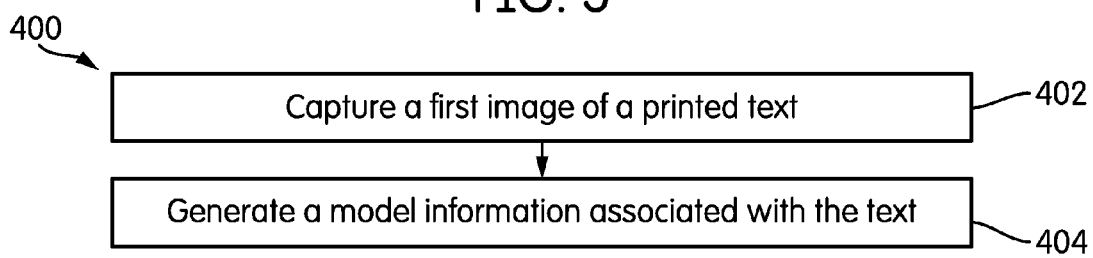
FIG. 4 is a flowchart of a process for converting a user-selected printed text to a synthesized image sequence, shown according to an exemplary embodiment.

Referring now to FIG. 4, a flow diagram of a process 400 for converting a user-selected printed text to a synthesized image sequence is shown, according to an exemplary embodiment. The process 400 includes capturing a first image of a printed text (step 402). The image may be captured by an image capture device 104 as described above. The process 400 further includes generating a model information associated with the text (step 404). The generation of the model information may be done by the processing electronics 300 as described above.

Figure 5:
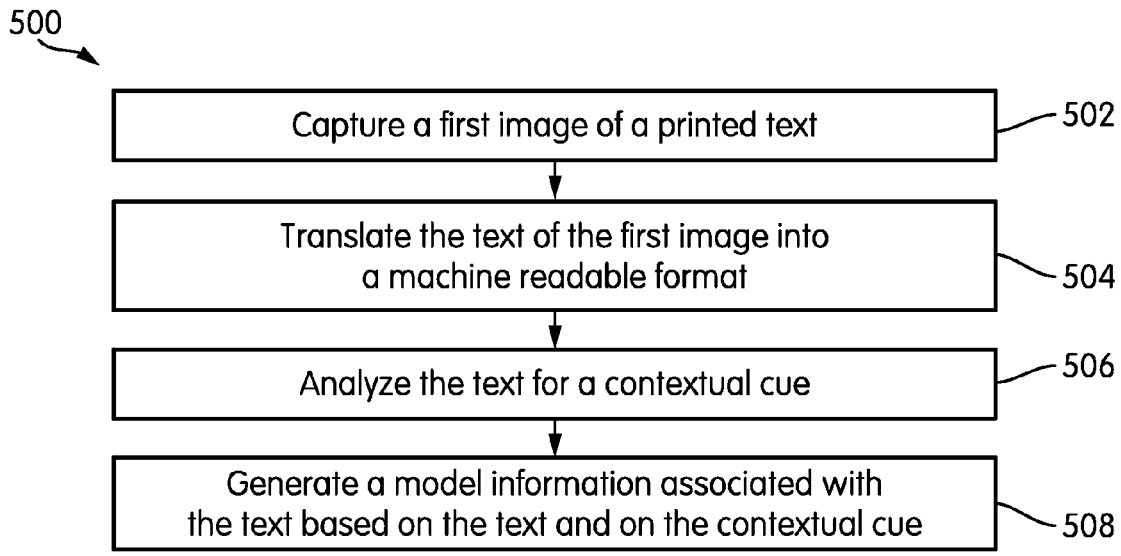
FIG. 5 is a flowchart of a process for converting a user-selected printed text to a synthesized image sequence, shown according to another embodiment.

Referring now to FIG. 5, another flow diagram of a process 500 for converting a user-selected printed text to a synthesized image sequence is shown, according to an exemplary embodiment. The process 500 includes capturing a first image of a printed text (step 502). The process 500 further includes translating the text of the first image into a machine-readable format (step 504). The translation is made using the image to text module 314, according to an exemplary embodiment. The process 500 further includes analyzing the text for a contextual cue (step 506). The analysis may be performed by the context analysis module 316, according to an exemplary embodiment. The process 500 further includes generating a model information associated with the text based on the text and on the contextual cue (step 508).

Figure 6:
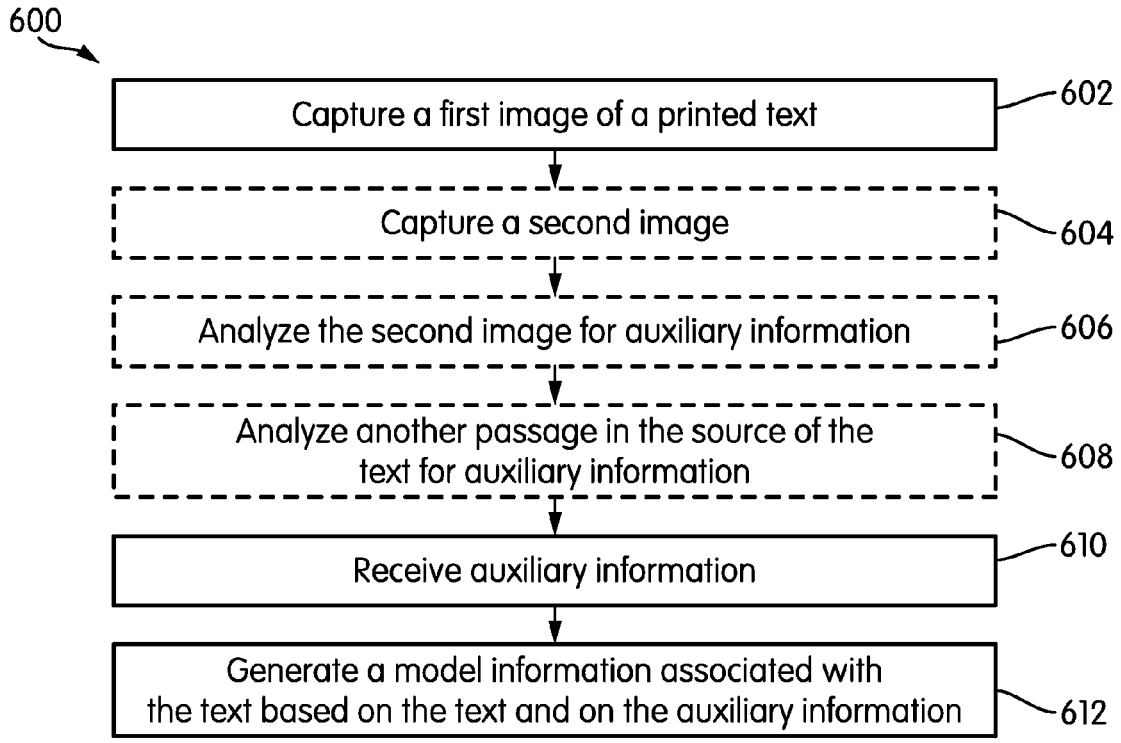
FIG. 6 is a flowchart of a process for converting a user-selected printed text to a synthesized image sequence, shown according to another embodiment.

Referring now to FIG. 6, another flow diagram of a process 600 for converting a user-selected printed text to a synthesized image sequence is shown, according to an exemplary embodiment. The process 600 includes capturing a first image of a printed text (step 602). The process 600 further includes receiving auxiliary information (step 610) and generating a model information associated with the text based on the text and on the auxiliary information (step 612). The process 600 may also include capturing a second image (step 604) and analyzing the second image for auxiliary information (step 606). The process 600 may also include analyzing another passage in the source of the text for auxiliary information (step 608). Steps 606 and 608 may be performed by the auxiliary information module 318, according to an exemplary embodiment.

Figure 7:
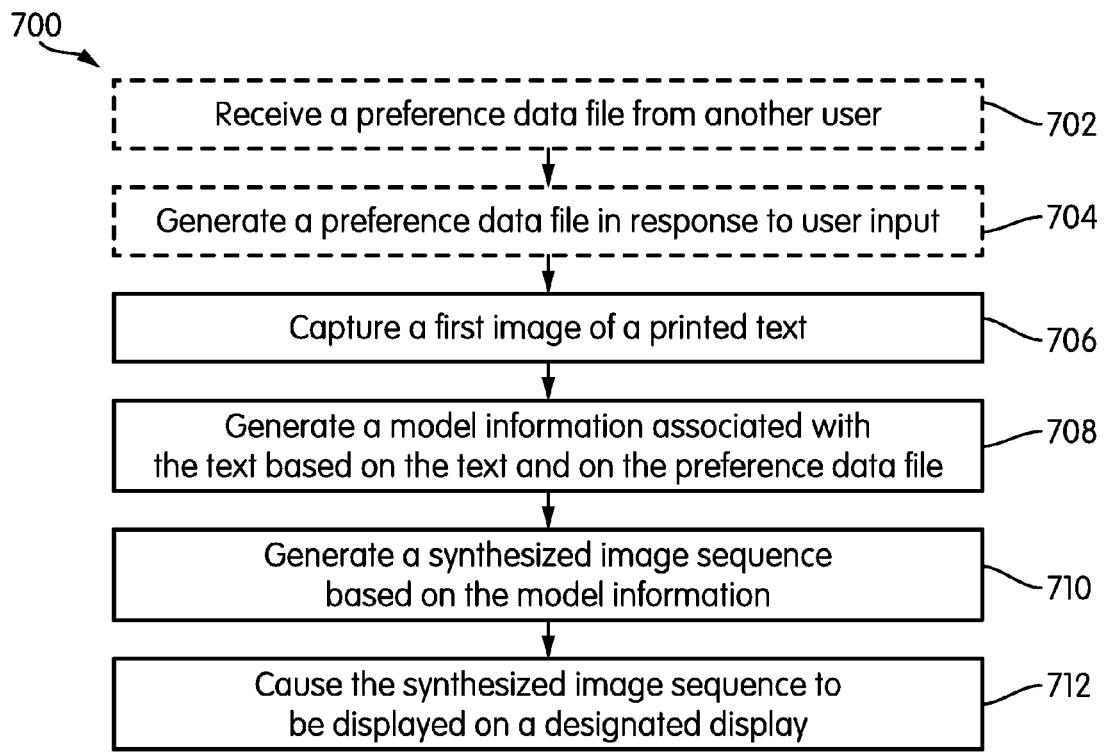
FIG. 7 is a flowchart of a process for converting a user-selected printed text to a synthesized image sequence, shown according to another embodiment.

Referring now to FIG. 7, a flow diagram of a process 700 for converting a user-selected printed text to a synthesized image sequence is shown, according to an exemplary embodiment. The process 700 includes capturing a first image of printed text (step 706), generating a model information associated with the text based on the text and on the preference data files (step 708), generating a synthesized image sequence based on the model information (step 710), and causing the synthesized image sequence to be displayed on a designated display (step 712). The data in the preference data files is similar to the data of preference data 330, according to an exemplary embodiment. The process 700 may also include receiving a preference data file from another user (step 702) and generating a preference data file in response to user input (step 704). The process 700 may include both steps 702 and 704 or only one of steps 702 and 704, according to various embodiments.

Figure 18:
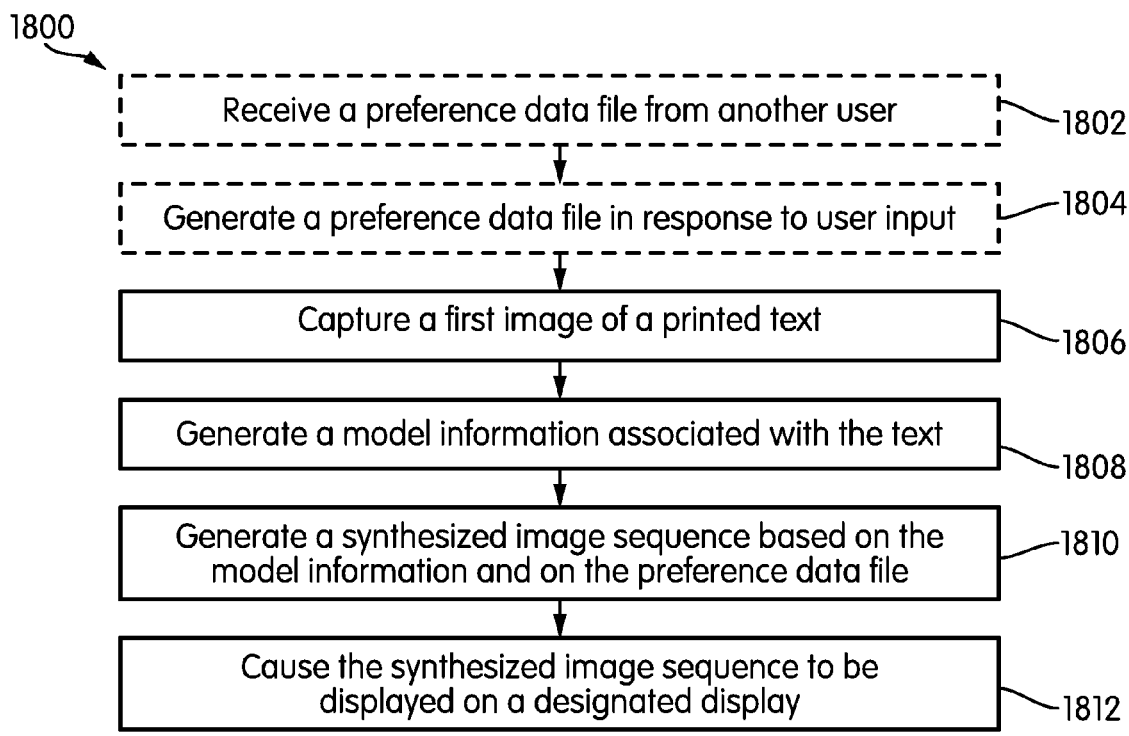
FIG. 18 is a flowchart of a process for converting a user-selected printed text to a synthesized image sequence, shown according to another embodiment.

Referring now to FIG. 18, a flow diagram of a process 1800 for converting a user-selected printed text to a synthesized image sequence is shown, according to an exemplary embodiment. The process 1800 includes capturing a first image of printed text (step 1806), generating a model information associated with the text (step 1808), generating a synthesized image sequence based on the model information based on the model information and on the preference data files (step 1810), and causing the synthesized image sequence to be displayed on a designated display (step 1812). The data in the preference data files is similar to the data of preference data 330, according to an exemplary embodiment. The process 1800 may also include receiving a preference data file from another user (step 1802) and generating a preference data file in response to user input (step 1804). The process 1800 may include either both of the steps 1802 and 1804 or only one of steps 1802 and 1804, according to various embodiments.

Figure 8:
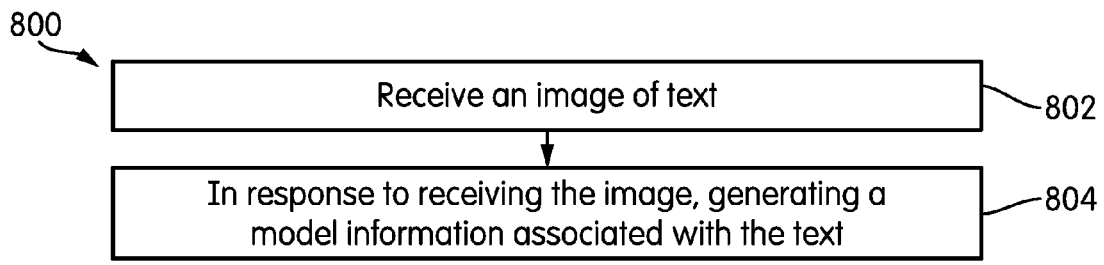
FIG. 8 is a flowchart of a process for converting a user-selected printed text to a synthesized image sequence, shown according to another embodiment.

Referring to FIG. 8, a flow diagram of a process 800 for converting a user-selected printed text to a synthesized image sequence is shown, according to an exemplary embodiment. The process 800 includes receiving an image of text (step 802) and in response to receiving the image, generating a model information associated with the text (step 804).

Figure 9:
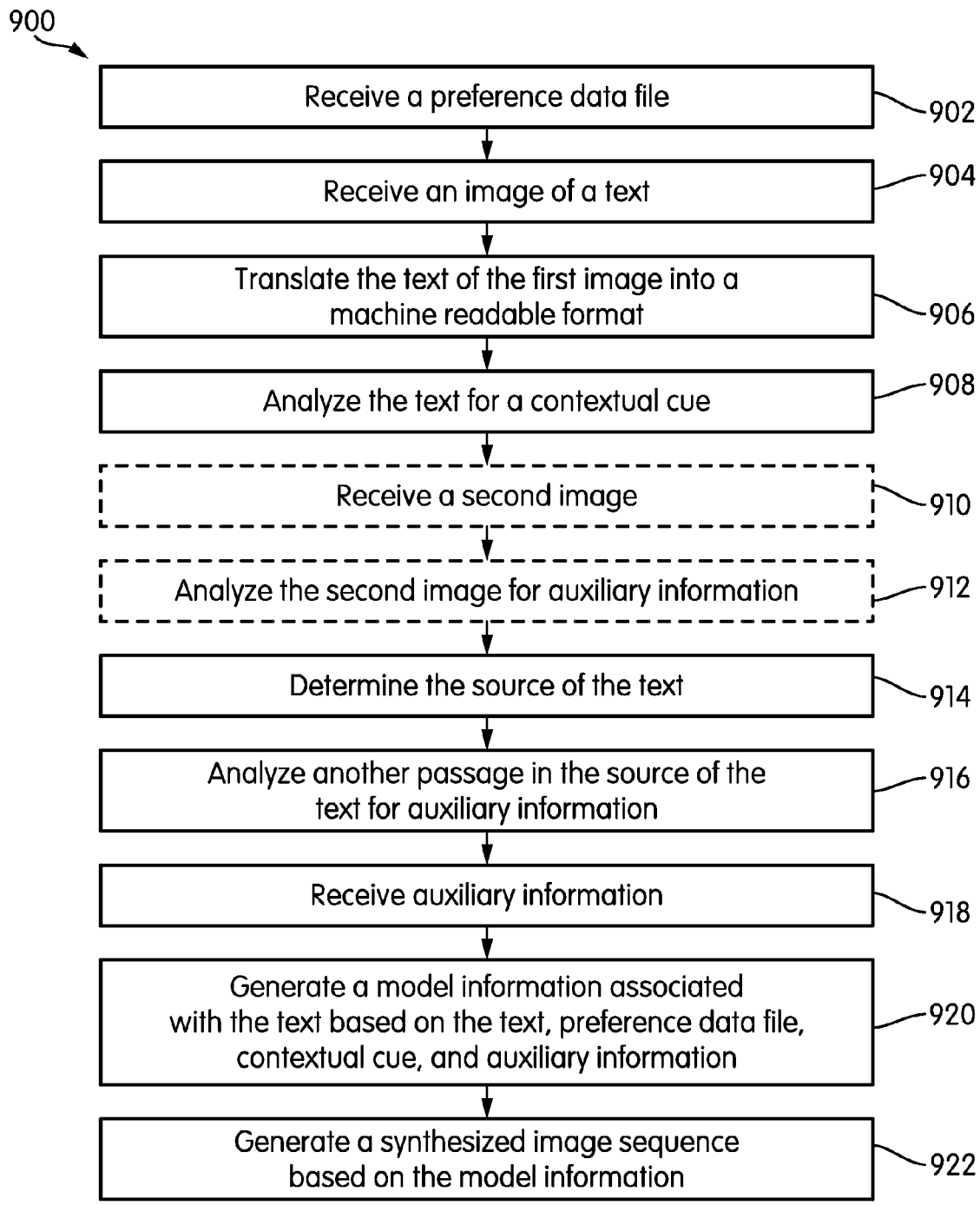
FIG. 9 is a flowchart of a process for converting a user-selected printed text to a synthesized image sequence, shown according to another embodiment.

Referring to FIG. 9, a flow diagram of a process 900 for converting a user-selected printed text to a synthesized image sequence using contextual cues, auxiliary information, and preference files is shown, according to an exemplary embodiment. The process 900 includes receiving a preference data file (step 902) and an image of text (step 904). The process 900 further includes translating the text of the first image into a machine readable format (step 906). The process 900 further includes analyzing the text for a contextual cue (step 908) using, for example, the context analysis module 316. The process 900 further includes determining the source of the text (step 914), analyzing another passage in the source of the text for auxiliary information (step 916), and receiving auxiliary information (step 918). The process 900 may include any combination of steps 914, 916, 918 for receiving auxiliary information. The process 900 further includes generating a model information associated with the text based on the text, preference data file, contextual cue, and auxiliary information (step 920) and generating a synthesized image sequence based on the model information (step 922). The process 900 may also include receiving a second image (step 910) and analyzing the second image for auxiliary information (step 912) using, for example, the auxiliary information module 318.

Figure 10:
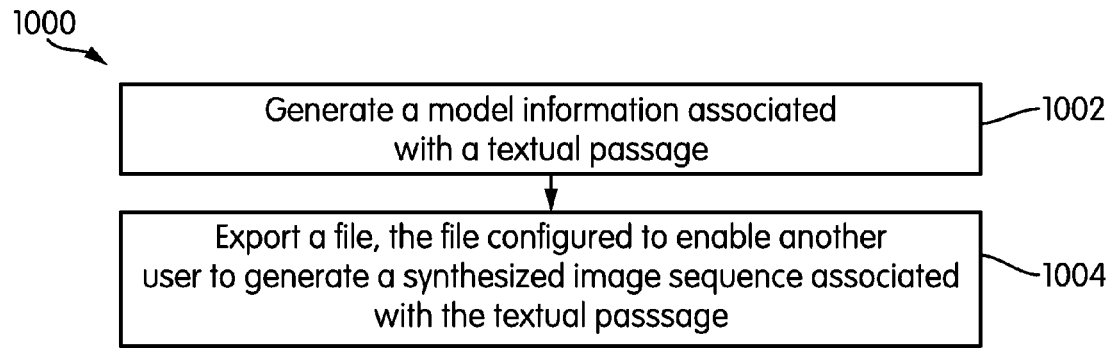
FIG. 10 is a flowchart of a process for sharing a synthesized image sequence generated from a user-selected text, shown according to an exemplary embodiment.

Referring to FIG. 10, a flow diagram of a computerized process 1000 for sharing a synthesized image sequence generated from a user-selected text is shown, according to an exemplary embodiment. The process 1000 includes generating a model information associated with a textual passage (step 1002). The process 1000 further includes exporting a file (step 1004). The file is configured to enable another user to generate the synthesized image sequence associated with the textual passage.

Figure 11:
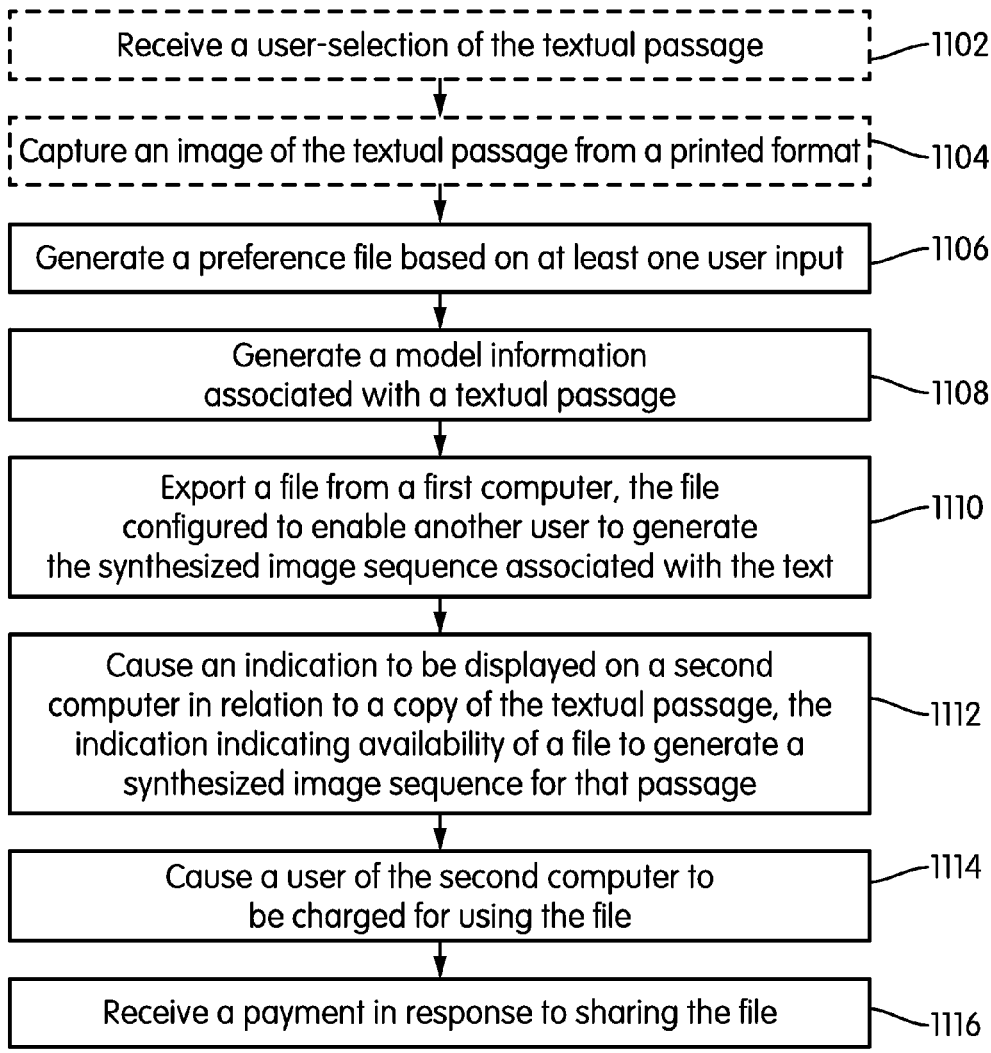
FIG. 11 is a flowchart of a process for sharing a synthesized image sequence generated from a user-selected text, shown according to another embodiment.

Referring to FIG. 11, a flow diagram of a process 1100 for sharing a synthesized image sequence generated from a user-selected text is shown, according to an exemplary embodiment. The process 1100 may be executed by the processing electronics 300 of FIG. 3 and more particularly the subscription module 326. The process 1100 includes generating a file based on at least one user input (step 1106). The file may be a preference file relating to user preferences, according to an exemplary embodiment. The process 1100 further includes generating a model information associated with a textual passage (step 1108). The process 1110 further includes exporting a file from a first computer, the file configured to enable another user to generate the synthesized image sequence associated with the text (step 1110). The file may be a model information, a preference data file, an image or object file, a synthesized image sequence, etc. The process 1100 further includes causing an indication to be displayed on a second computer in relation to a copy of the textual passage, the indication indicating availability of a file to generate a synthesized image sequence for the textual passage (step 1112). The process 1100 further includes causing a user of the second computer to be charged for using the file (step 1114) and receiving a payment in response to sharing the file (step 1116). Steps 1114 and 1116 may be managed and executed by, for example, the subscription module 326. The process 1100 may also include receiving a user selection of a textual passage (step 1102) and capturing an image of the textual passage from a printed format (step 1104).

Figure 12:
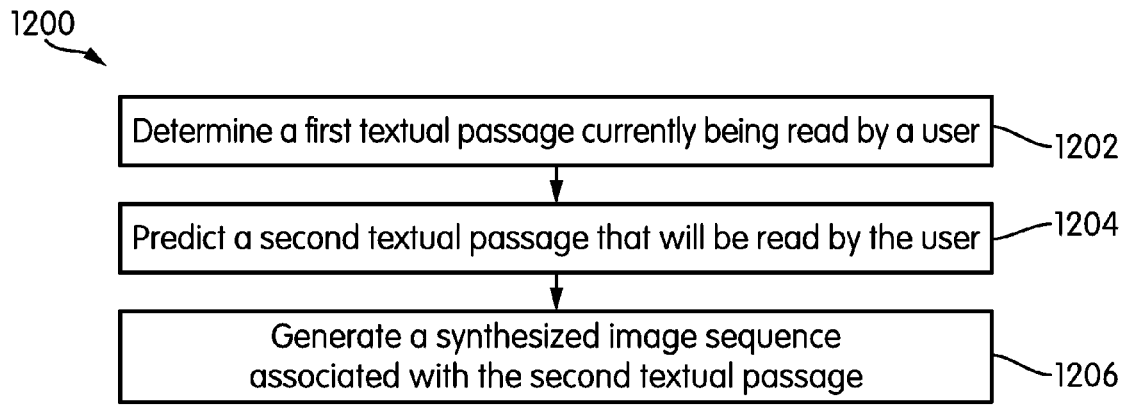
FIG. 12 is a flowchart of a process for converting a textual passage to a synthesized image sequence, shown according to an exemplary embodiment.
Figure 13:
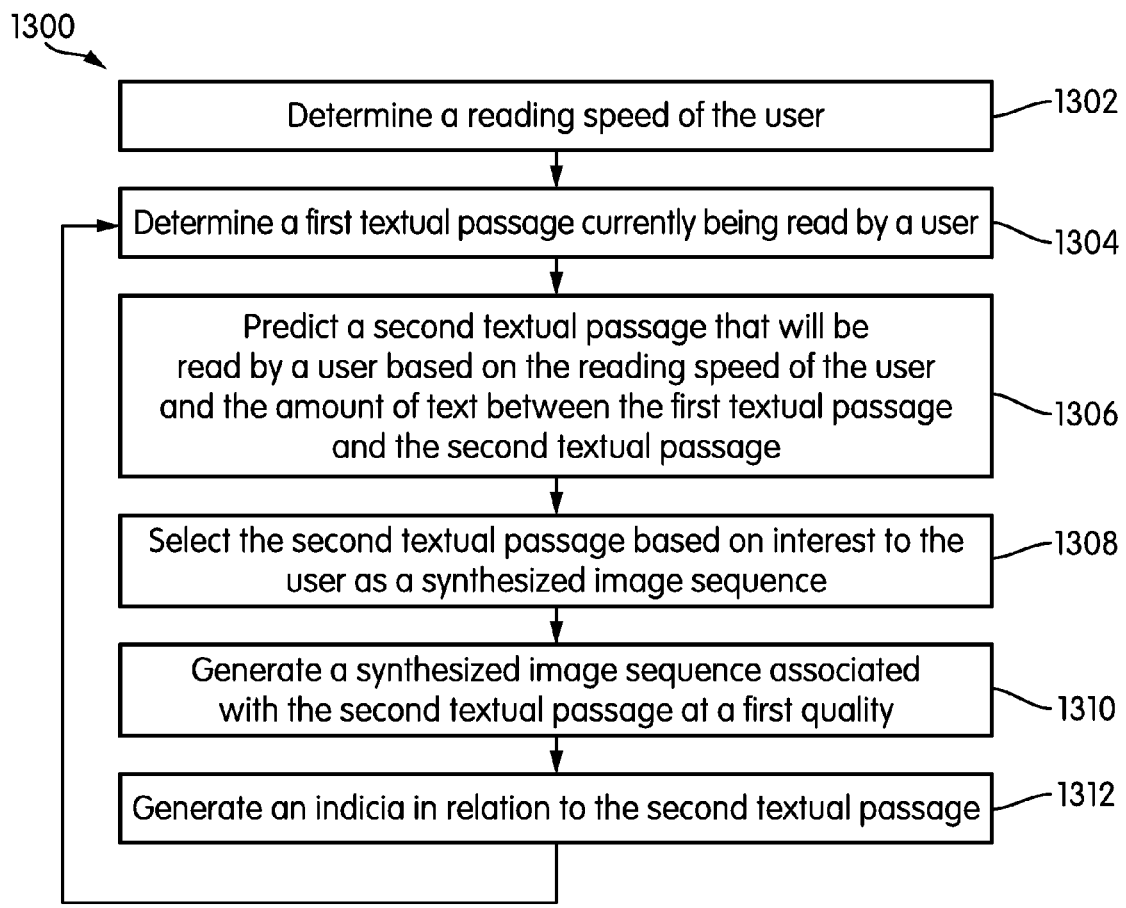
FIG. 13 is a flowchart of a process for converting a textual passage to a synthesized image sequence, shown according to another embodiment.
Figure 14:
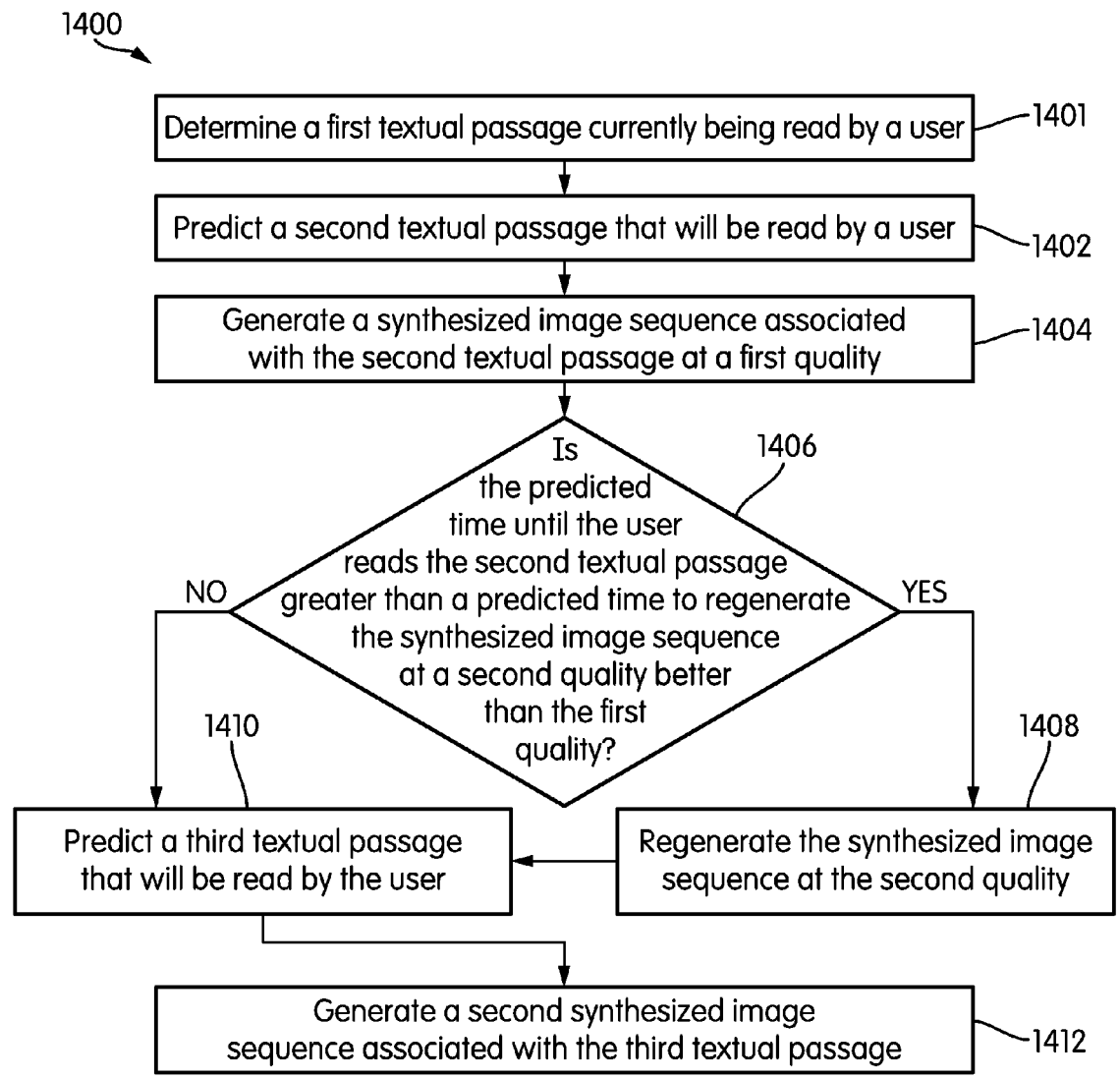
FIG. 14 is a flowchart of a process for converting a textual passage to a synthesized image sequence, shown according to another embodiment.

Referring generally to FIGS. 12-14, processes for executing the methods described with reference to the passage prediction module 324 of FIG. 3 are shown. Referring now to FIG. 12, a flow diagram of a computerized process 1200 for converting a textual passage to a synthesized image sequence is shown, according to an exemplary embodiment. The process 1200 includes determining a first textual passage currently being read by a user (step 1202), predicting a second textual passage that will be read by a user (step 1204). The prediction may be made by the passage prediction module 324, according to an exemplary embodiment. The process 1200 further includes generating a synthesized image sequence associated with the second textual passage (step 1206).

Referring now to FIG. 13, a flow diagram of a process 1300 for converting a textual passage to a synthesized image sequence is shown, according to an exemplary embodiment. The process 1300 includes determining a reading speed of the user (step 1302). The reading speed may be based on a number of pages per minute, an average number of pages per minute, words per minute, etc. The process 1300 further includes determining a first textual passage currently being read by a user (step 1304), predicting a second textual passage that will be read by a user based on the reading speed of the user and the amount of text between the first textual passage and the second textual passage (step 1306). The first textual passage may be automatically determined as the text presently displayed to the user if the text is displayed on an electronic display, according to an exemplary embodiment. The process 1300 further includes selecting the second textual passage based on interest to the user as a synthesized image sequence (step 1308). The step 1308 includes selecting the second textual passage based on potential interest to the reader of the textual passage, verbs, adjectives, or a combination of verbs and adjectives within the textual passage (describing the action in the textual passage), or otherwise. The process 1300 further includes generating a synthesized image sequence associated with the second textual passage at a first quality (step 1310). The process 1300 further includes generating an indicia in relation to the second textual passage (step 1310). The process 1300 may then return to step 1304, determining another (e.g., a third) textual passage that is currently being read by the user. For example, while the process is predicting the second textual passage and generating the associated synthesized image sequence, the user has likely continued reading such that when the process returns to step 1304, the textual passage that the user is currently reading is likely a another (e.g. a third) textual passage. A fourth textual passage will be predicted based on the third textual passage, and so on.

Referring now to FIG. 14, a flow diagram of a process 1400 for converting a textual passage to a synthesized image sequence is shown, according to an exemplary embodiment. The process 1400 includes determining a first textual passage currently being read by a user (step 1401), predicting a second textual passage that will be read by a user (step 1402), and generating a synthesized image sequence associated with the second textual passage at a first quality (step 1404). The process 1400 further includes determining if the predicted time until the user reads the second textual passage is greater than a predicted time to regenerate the synthesized image sequence at a second quality better than the first quality (step 1406). In other words, step 1406 includes determining if there is enough time to create a better synthesized image sequence. If there is enough time, the process 1400 includes regenerating the synthesized image sequence at the second quality (step 1408). If there is not enough time, the process 1400 skips step 1408. The process 1400 then includes predicting a third textual passage that will be read by the user (step 1410). Predicting the third textual passage may be based on determining the passage currently being read by the user, the reading speed of the user, and the amount of text between the textual passage currently being read and the third textual passage. The process 1400 further includes generating a second synthesized image sequence associated with the third textual passage (step 1412). According to one embodiment, the first textual passage and the second textual passage are from the same source text. According to another embodiment, the third textual passage is from the same source text as the first textual passage and the second textual passage.

According to an exemplary embodiment, the systems and methods of the present disclosure may be used to convert a textual passage into a synthesized image sequence in "real-time" (e.g., as the text is being written or typed). According to one embodiment, text may continually be sent to processing electronics 300 for creating a model information as the text is being created. According to another embodiment, text may continually be sent to processing electronics 300 for creating a synthesized image sequence as the text is being created. According to other embodiments, as the textual passage is being written, an image of the text may continually be taken and sent to the processing electronics 300 for creating a model information and a synthesized image sequence. By generating synthesized image sequences in real-time, it allows for streaming of the synthesized image sequence since portions of the synthesized image sequences are not generated or loaded on a display until one portion of the synthesized image sequences have already been viewed.

In one embodiment, when a user finishes typing or writing a sentence or paragraph, the text may be automatically sent to the processing electronics 300. In another embodiment, an indication that a writer has finished writing a sentence or paragraph may trigger the text to be sent to the processing electronics 300. The indication may be a manual indication from a writer, may be automatically triggered upon the pressing of an "Enter" or "Return" button on a keyboard, or otherwise. In yet another embodiment, the text is received by the processing electronics as the text is being typed.

In one embodiment, when a user finishes typing or writing a sentence or paragraph, the image of the text may be automatically taken by an image capture device. In another embodiment, an indication that a writer has finished writing a sentence or paragraph may be sent to the image capture device in order to trigger the capture of the image of text. The indication may be a manual indication from a writer, may be automatically triggered upon the pressing of an "Enter" or "Return" button on a keyboard, or otherwise.

In addition to the contextual cues as described above, when analyzing the images of text in "real-time," the processing electronics 300 and more particularly the context analysis module 316 may determine a stage direction as a contextual cue. In one embodiment, the "real-time" aspect may be applied when a writer is writing a script for a play or other live performance. The writer may include stage directions (e.g., exit stage left, enter stage right, etc.) with the other text. When the text is eventually received by the processing electronics 300, the processing electronics 300 may recognize the stage directions and use the stage directions to control the motions of various characters and objects in the model information and synthesized image sequence. Deleting a passage of text may return the displayed image to a previous stage. For example, the writer may delete a stage direction "Character A exits stage left," and in response, the processing electronics 300 may cause Character A to be returned to the displayed stage. The writer then may type "Character A exits stage right," and when the text is received by the processing electronics 300, the processing electronics 300 generate a model information and synthesized image sequence of Character A exiting stage right.

Figure 15:
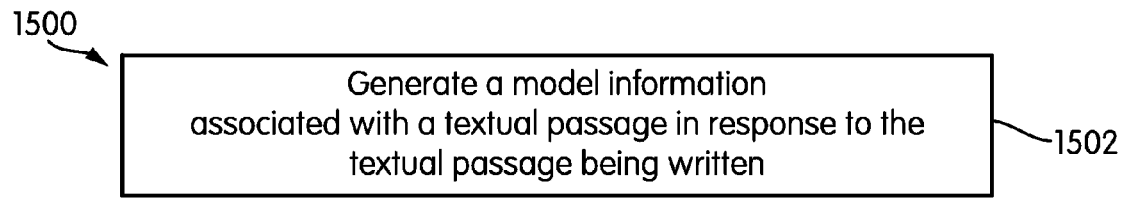
FIG. 15 is a flowchart of a process for converting a textual passage to a synthesized image sequences, shown according to an exemplary embodiment.
Figure 16:
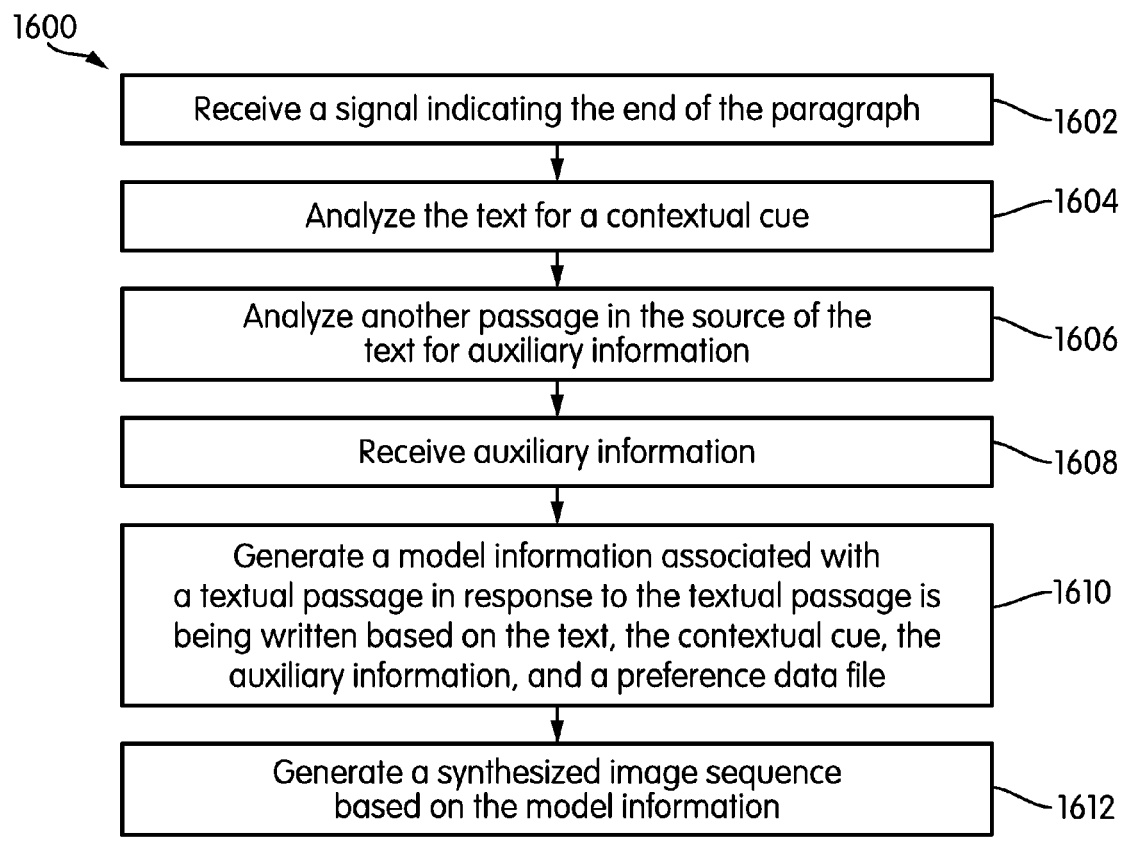
FIG. 16 is a flowchart of a process for converting a textual passage to a synthesized image sequences, shown according to another embodiment.
Figure 17:
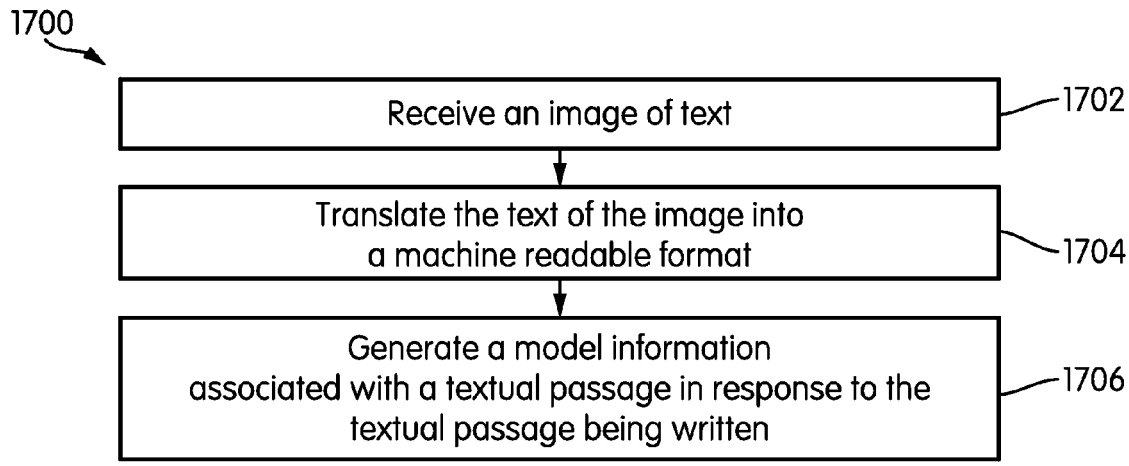
FIG. 17 is a flowchart of a process for converting a textual passage to a synthesized image sequences, shown according to another embodiment.

Referring generally to FIGS. 15-17, various methods for converting a textual passage to synthesized image sequences in "real-time" are shown in greater detail. Referring now to FIG. 15, a flow diagram of a process 1500 for generating a synthesized image sequence in real-time is shown, according to an exemplary embodiment. The process 1500 includes generating a model information associated with a textual passage in response to the textual passage being written (step 1502). As discussed above, the textual passage being written may be "instantly" analyzed (e.g., analyzed shortly after creation of the text).

Referring now to FIG. 16, another flow diagram of a process 1600 for generating a synthesized image sequence in real-time is shown, according to an exemplary embodiment. The process 1600 includes receiving a signal indicating the end of a paragraph (step 1602). The signal may be the pressing of the "Enter" or "Return" button on a keyboard or may be manually indicated by a user. The process 1600 further includes analyzing the text for a contextual cue (step 1604) using, for example, the context analysis module 316. The process 1600 further includes analyzing another passage in the source of the text for auxiliary information (step 1606) using, for example, the auxiliary information module 318. The process 1600 further includes receiving the auxiliary information (step 1608). The process 1600 further includes generating a model information associated with the textual passage in response to the textual passage being written based on text, the contextual cue, the auxiliary information, and a preference data file (step 1610). The process 1600 further includes generating a synthesized image sequence based on the model information (step 1612).

Referring now to FIG. 17, another flow diagram of a process 1700 for generating a synthesized image sequence in real-time is shown, according to an exemplary embodiment. The process 1700 includes receiving an image of text (step 1702). The text may be part of a textual passage being written in real-time. The process 1700 further includes translating the text of the image into a machine-readable format (step 1704). The process 1700 further includes generating a model information associated with a textual passage in response to the textual passage being written (step 1706).

The systems and methods of the present disclosure describe visual content associated with synthesized image sequences. However, it should be understood that the synthesized image sequences may be enhanced with other outputs. For example, a video clip generated by the systems and methods described herein may include sound. The synthesized image sequences as described in the present disclosure are not limiting; i.e., the synthesized image sequences may include other components.

The construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. The elements and assemblies may be constructed from any of a wide variety of materials that provide sufficient strength or durability, in any of a wide variety of colors, textures, and combinations. Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner. Accordingly, all such modifications are intended to be included within the scope of the present disclosure. The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other exemplary embodiments without departing from scope of the present disclosure or from the scope of the appended claims.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for converting a textual passage to a synthesized image sequence, comprising:
    processing electronics configured to determine a first textual passage of a text source currently being read by a user, to predict a second textual passage of the text source that will be read by the user, and to generate a synthesized image sequence associated with the second textual passage.

2. The system of claim 1, wherein the first textual passage and the second textual passage are in an electronic format.

3. The system of claim 1, wherein the first textual passage and the second textual passage are in a print format.

4. The system of claim 1, wherein the processing electronics are further configured to generate an indicia in relation to the second textual passage.

5. The system of claim 1, wherein the processing electronics are further configured to predict the second textual passage that will be read by the user based on an amount of text between the first textual passage and the second textual passage.

6. The system of claim 5, wherein the amount of text between the first textual passage and the second textual passage comprises a number of pages.

7. The system of claim 5, wherein the amount of text between the first textual passage and the second textual passage comprises a number of paragraphs.

8. The system of claim 5, wherein the amount of text between the first textual passage and the second textual passage comprises a number of sentences.

9. The system of claim 5, wherein the amount of text between the first textual passage and the second textual passage comprises a number of words.

10. The system of claim 5, wherein the amount of text between the first textual passage and the second textual passage comprises a number of letters.

11. The system of claim 1, wherein the processing electronics are further configured to predict the second textual passage that will be read by the user based on a reading speed of the user.

12. The system of claim 11, wherein the processing electronics are further configured to determine the reading speed of the user.

13. The system of claim 12, wherein the reading speed of the user comprises a number of pages per minute.

14. The system of claim 12, wherein the reading speed of the user comprises a number of words per minute.

15. The system of claim 1, wherein the processing electronics are further configured to predict the second textual passage that will be read by the user based on an image synthesization speed of the processing electronics.

16. The system of claim 1, wherein the processing electronics are further configured to select the second textual passage based on interest to the user as a synthesized image sequence.

17. The system of claim 1, wherein the processing electronics are further configured to cause the synthesized image sequence to be displayed as the user is reading the second textual passage.

18. The system of claim 1, wherein the processing electronics are further configured to cause the synthesized image sequence to be displayed at a time that the user is predicted to read the second textual passage.

19. The system of claim 1, wherein the processing electronics are further configured to cause the synthesized image sequence to be displayed as the user is reading a textual passage proximate the second textual passage.

20. The system of claim 1, wherein the processing electronics are further configured to cause the synthesized image sequence to be displayed as the synthesized image sequence is generated.

21. The system of claim 1, wherein the processing electronics are further configured to generated the synthesized image sequence at a quality level based on a predicted time until the user reads the second textual passage.

22. A system for converting a textual passage to a synthesized image sequence, comprising:
    processing electronics configured to determine a reading speed of a user, to determine a first textual passage of a text source currently being read by the user, to predict a second textual passage of the text source that will be read by the user based on the reading speed of the user and an amount of text between the first textual passage and the second textual passage, and to generate a synthesized image sequence associated with the second textual passage.

23. The system of claim 22, wherein the amount of text between the first textual passage and the second textual passage comprises a number of pages.

24. The system of claim 22, wherein the amount of text between the first textual passage and the second textual passage comprises a number of paragraphs.

25. The system of claim 22, wherein the amount of text between the first textual passage and the second textual passage comprises a number of sentences.

26. The system of claim 22, wherein the amount of text between the first textual passage and the second textual passage comprises a number of words.

27. The system of claim 22, wherein the amount of text between the first textual passage and the second textual passage comprises a number of letters.

28. The system of claim 22, wherein the reading speed of the user comprises a number of pages per minute.

29. The system of claim 22, wherein the reading speed of the user comprises a number of words per minute.

30. The system of claim 22, wherein the processing electronics are further configured to predict the second textual passage that will be read by the user based on an image synthesization speed of the processing electronics.

31. The system of claim 22, wherein the processing electronics are further configured to generated the synthesized image sequence at a quality level based on a predicted time until the user reads the second textual passage.

32. The system of claim 22, wherein the processing electronics are further configured to cause the synthesized image sequence to be displayed as the user is reading the second textual passage.

33. The system of claim 22, wherein the processing electronics are further configured to cause the synthesized image sequence to be displayed at a time that the user is predicted to read the second textual passage.

34. The system of claim 22, wherein the processing electronics are further configured to cause the synthesized image sequence to be displayed as the user is reading a textual passage proximate the second textual passage.

35. A system for converting a textual passage to a synthesized image sequence, comprising:

processing electronics configured to determine a first textual passage of a text source currently being read by the user, to predict a second textual passage of the text source that will be read by the user, to generate a synthesized image sequence associated with the second textual passage at a first quality, to predict a time until the user reads the second textual passage, to predict a time to regenerate the synthesized image sequence at a second quality better than the first quality, to regenerate the synthesized image sequence at the second quality when the predicted time to regenerate the synthesized image sequence at the second quality is less than the predicted time until the user reads the second textual passage, and to predict a third textual passage of the text source that will be read by the user when the predicted time to regenerate the synthesized image sequence at the second quality is greater than the predicted time until the user reads the second textual passage.

* * * * *